(12) United States Patent
Zimmer et al.

(10) Patent No.: US 11,676,247 B2
(45) Date of Patent: Jun. 13, 2023

(54) METHOD, DEVICE, AND COMPUTER PROGRAM FOR IMPROVING THE RECONSTRUCTION OF DENSE SUPER-RESOLUTION IMAGES FROM DIFFRACTION-LIMITED IMAGES ACQUIRED BY SINGLE MOLECULE LOCALIZATION MICROSCOPY

(71) Applicant: INSTITUT PASTEUR, Paris (FR)

(72) Inventors: Christophe Zimmer, Verrieres le Buisson (FR); Wei Ouyang, Paris (FR)

(73) Assignee: INSTITUT PASTEUR, Paris (FR)

( * ) Notice: Subject to any disclaimer, the term of this patent is extended or adjusted under 35 U.S.C. 154(b) by 434 days.

(21) Appl. No.: 16/635,053

(22) PCT Filed: Jul. 26, 2018

(86) PCT No.: PCT/EP2018/070365
§ 371 (c)(1),
(2) Date: Jan. 29, 2020

(87) PCT Pub. No.: WO2019/025298
PCT Pub. Date: Feb. 7, 2019

(65) Prior Publication Data
US 2020/0250794 A1  Aug. 6, 2020

(30) Foreign Application Priority Data

Jul. 31, 2017 (EP) .................... 17306022
Mar. 1, 2018 (EP) .................... 18305225

(51) Int. Cl.
*G06N 3/08* (2023.01)
*G06T 3/40* (2006.01)

(52) U.S. Cl.
CPC ............ *G06T 3/4076* (2013.01); *G06N 3/08* (2013.01); *G06T 3/4069* (2013.01)

(58) Field of Classification Search
CPC ....... G06N 3/08; G06T 3/4046; G06T 3/4053; G06T 3/4069; G06T 3/4076; G06T 7/269;
(Continued)

(56) References Cited

U.S. PATENT DOCUMENTS

2018/0075581 A1* 3/2018 Shi ................... G06T 3/4046
2018/0293707 A1* 10/2018 El-Khamy ........... G06T 3/4076
2018/0293713 A1* 10/2018 Vogels ................. G06K 9/627

OTHER PUBLICATIONS

Huglier et al., "Sparse deconvolution of high-density super-resolution images." Scientific reports 6.1 (2016): 1-11 (Year: 2016).*
(Continued)

*Primary Examiner* — Sumati Lefkowitz
*Assistant Examiner* — Michael Adam Shariff
(74) *Attorney, Agent, or Firm* — Greenblum & Bernstein, P.L.C.

(57) ABSTRACT

The invention relates to reconstructing a synthetic dense super-resolution image from at least one low-information-content image, for example from a sequence of diffraction-limited images acquired by single molecule localization microscopy. After having obtained such a sequence of diffraction-limited images, a sparse localization image is reconstructed from the obtained sequence of diffraction-limited images according to single molecule localization microscopy image processing. The reconstructed sparse localization image and/or a corresponding low-resolution wide-field image are input to an artificial neural network and a synthetic dense super-resolution image is obtained from the artificial neural network, the latter being trained with training data comprising triplets of sparse localization images, at least partially corresponding low-resolution wide-field images, and corresponding dense super-resolution images, as a function of a training objective function comparing dense super-resolution images and corresponding outputs of the artificial neural network.

20 Claims, 22 Drawing Sheets

(58) Field of Classification Search
CPC ............... G06T 7/277; G06T 9/002; G06T 2207/20081; G06T 2207/20084; G06T 2207/10056; G06T 2207/10064

See application file for complete search history.

(56) References Cited

OTHER PUBLICATIONS

Badrinarayanan et al., "Segnet: A deep convolutional encoder-decoder architecture for image segmentation." IEEE transactions on pattern analysis and machine intelligence 39.12 (2017): 2481-2495 (Year: 2017).*

Yates et al., "Image stitching with single-hidden layer feedforward neural networks." 2016 International Joint Conference on Neural Networks (IJCNN). IEEE, 2016. (Year: 2016).*

Barsic et al. "Three-dimensional super-resolution and localization of dense clusters of single molecules." Scientific reports 4.1 (2014): 1-8.) (Year: 2014).*

Bin et al. "High-quality face image SR using conditional generative adversarial networks." arXiv preprint arXiv:1707.00737 (2017) (Year: 2017).*

Bates et al. "Multicolor super-resolution imaging with photoswitchable fluorescent probes." Science 317.5845 (2007): 1749-1753) (Year: 2007).*

Gupta et al. "Non-parametric image super-resolution using multiple images." IEEE International Conference on Image Processing 2005. vol. 2. IEEE, 2005 (Year: 2005).*

Betzig, E. et al., "Imaging intracellular fluorescent proteins at nanometer resolution", Science (80-.), 313 , (2006), pp. 1642-1645.

Rust, M. J., Bates, M. & Zhuang, X., "Sub-diffraction-limit imaging by stochastic optical reconstuction microscopy (STORM)", Nat Methods 3, (2006), pp. 793-795.

Ronneberger, O., Fischer, P. & Brox, T., "U-net: Convolutional networks for biomedical image segmentation", Medical Image Computing and ComputerAssisted Intervention—MICCAI 2015. Lecture Notes in Computer Science, 9351, Springer International Publishing, (2015),pp. 234-241.

Goodfellow, I. et al., "Generative Adversarial Nets", (2014), pp. 2672-2680.

Isola, P, Zhu, J.-Y., Zhou, T. and Efros, A. A., "Image-to-Image Translation with Conditional Adversarial Networks", (http://arxiv.org/abs/1611.07004), (2016).

Abadi, M. et al., "TensorFlow: Large-Scale Machine Learning on Heterogeneous Distibuted Systems", (2016).

Kingma, D. P. and Ba, J. Adam, "A Method for Stochastic Optimization", (2014).

Anthony Barsic et al., "Three-dimensional 1-20 super-resolution and localization of dense clusters of single molecules", Scientific Reports, vol. 4, No. 1, XP055438421, DOI: 10.1038/ srepO5388, Jun. 23, 2014.

Vijay Badri Narayanan et al., "SegNet: A Deep Convolutional Encoder-Decoder Architecture for Image Segmentation ", IEEE Transactions on Pattern Analysis and Machine Intelligence, vol. 39, No. 12, XP055438349, ISSN: 0162-8828, DOI: 10.1109/TPAMI.2016.2644615, Oct. 10, 2016 , pp. 2481-2495.

Eugenio F. Fornasiero et al., "Super-resolution imaging for cell biologists : Concepts, applications, current challenges and developments", BIOESSAYS, vol. 37, No. 4, XP055437863, ISSN: 0265-9247, DOI: 10.1002/bies.201400170, Apr. 1, 2015, pp. 436-451.

Romero Adriana et al., "Unsupervised Deep Feature Extraction for Remote Sensing Image Classification", IEEE Transactions on Geoscience and Remote Sensing, IEEE Service Center, Piscataway, NJ, US, vol. 54, No. 3, XP011608493, ISSN: 0196-2892, DOI: 10.1109/TGRS.2015.2478379 [retrieved on Mar. 1, 2016], Mar. 1, 2016, pp. 1349-1362.

Stefan W Hell et al., "The Jan. 20, 2015 super-resolution microscopy roadmap", Journal of Physics D: Applied Physics, Institute of Physics Publishing Ltd, GB, vol. 48, No. 44, XP020290395, ISSN: 0022-3727, DOI: 10.1088/0022-3727/ 48/ 44/ 443001 [retrieved on Oct. 15, 2015], Oct. 15, 2015, pp. 443001.

Li Xu et al., "Deep Convolutional Neural Network for Image Deconvolution ", Retrieved from the Internet: URL:https://papers.nips.cc/paper/5485-deep -convolutional -neural -network-for-image-de convolution.pdf [retrieved on Sep. 4, 2018], Jan. 1, 2014.

International Search Report issued in International Patent Application No. PCT/EP2018/070365, dated Oct. 15, 2018.

\* cited by examiner

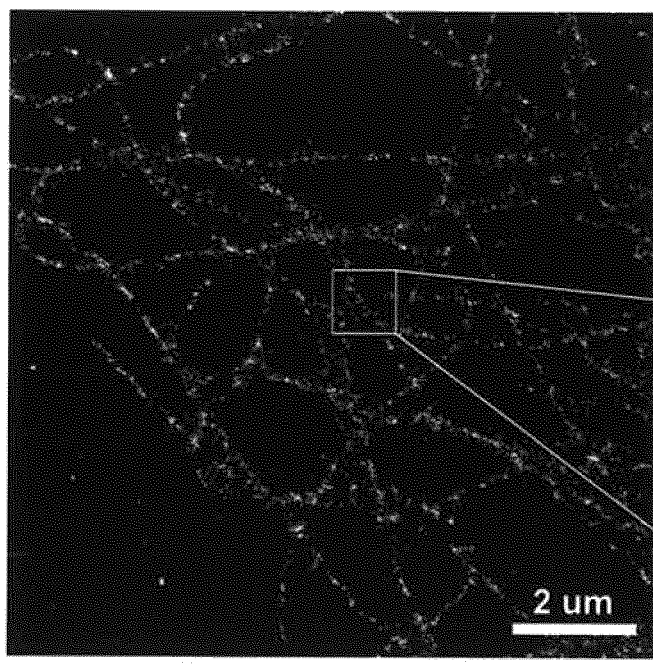 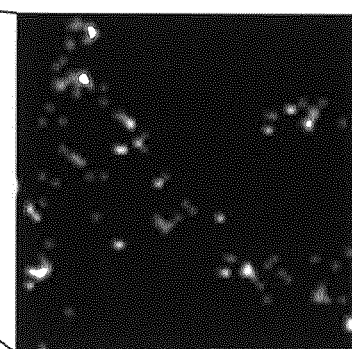
Fig. 11a        Fig. 11b
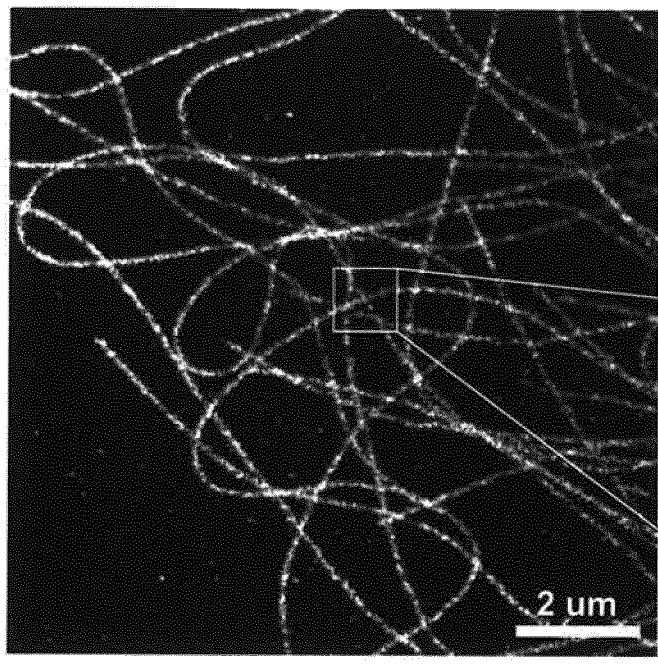 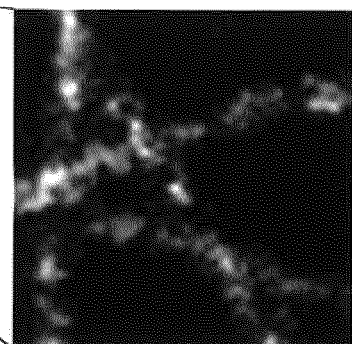
Fig. 12a        Fig. 12b

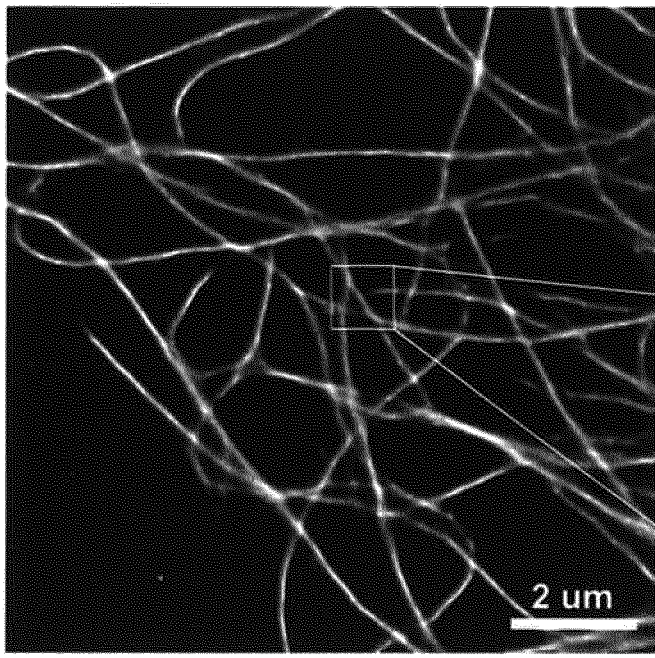
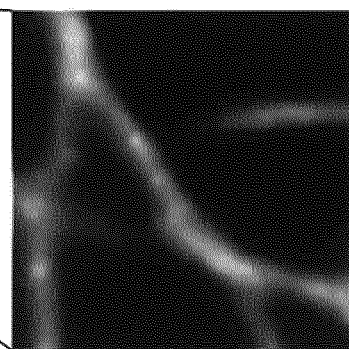
Fig. 13a　　　　　　　　　　Fig. 13b
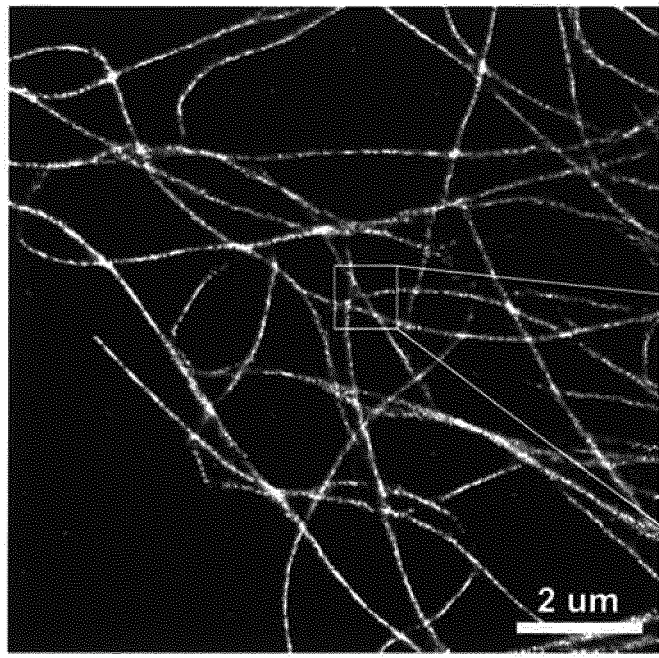
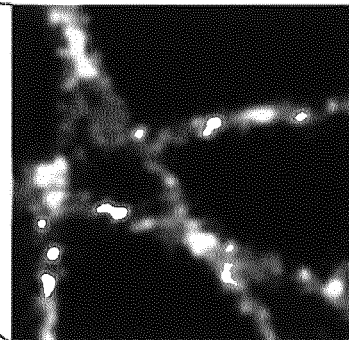
Fig. 14a　　　　　　　　　　Fig. 14b

METHOD, DEVICE, AND COMPUTER PROGRAM FOR IMPROVING THE RECONSTRUCTION OF DENSE SUPER-RESOLUTION IMAGES FROM DIFFRACTION-LIMITED IMAGES ACQUIRED BY SINGLE MOLECULE LOCALIZATION MICROSCOPY

FIELD OF THE INVENTION

The invention generally relates to the field of microscopy and image processing. More particularly, the invention concerns a method, a device, and a computer program for improving the reconstruction of dense super-resolution images, i.e. images having resolution beyond the diffraction limit, from diffraction-limited images acquired by single molecule localization microscopy, making it possible to decrease the acquisition time of the diffraction-limited images used for reconstructing the dense super-resolution images, without significantly affecting the quality and the resolution of the reconstructed images.

BACKGROUND OF THE INVENTION

Fluorescence microscopy methods that overcome the diffraction limit of resolution (about 200 to 300 nm) allow imaging of biological structures with molecular specificity close to the molecular scale. Among super-resolution microscopy approaches, those based on single molecule localization, such as PALM (photo-activated localization microscopy), STORM (stochastic optical reconstruction microscopy), or PAINT (point accumulation for imaging in nanoscale topography) are particularly attractive owing to their extreme spatial resolution and ease of implementation.

In these methods of single molecule localization microscopy (SMLM), small random subsets of fluorophores are imaged in many consecutive diffraction-limited images, computationally detected and localized with high precision, and the combined fluorophore localizations are used to generate a dense super-resolution image (or dense image) defined for example as a 2D histogram of independent localizations $(x_i, y_i)$.

In practice, the number of diffraction-limited images (also referred to as raw images) underlying a single dense super-resolution image, denoted K, is typically comprised between 1 000 and 100 000. This constraint follows from two conditions that must be met simultaneously to ensure high spatial resolution:

a low number of activated fluorophores per diffraction-limited image, denoted $\rho$, to avoid overlaps between diffraction limited spots and allow the precise localization of individual molecules. The value of $\rho$ is typically comprised between 10 and 100 (this number depends on the size and resolution of the sensor, it needs to be small enough so that diffraction limited spots from activated fluorophores do not overlap or overlap only rarely), and a large number of independent fluorophore localizations, i.e. localizations corresponding to distinct fluorophores, denoted N (with $N=K \times \rho$), to ensure sufficiently dense sampling of the underlying biological structures.

FIG. 1 illustrates the reconstruction of a dense super-resolution image from diffraction-limited images each comprising a low number of active fluorophore appearing as diffraction-limited fluorescent spots, taking as an example the STORM image processing.

As illustrated, images 100-1 to 100-K of set 105 comprising K diffraction-limited images (or raw images), taken at time $t_1$ to $t_k$, respectively, are used to reconstruct dense super-resolution image 115 according to STORM image processing (dense super-resolution image 115 may be called STORM image), i.e. fluorophore detection, fluorophore localization with sub-pixel and sub-diffraction precision and displaying a 2D histogram of independent localizations $(x_i, y_i)$, denoted 110.

For the sake of illustration, the mean number n of fluorophore appearing as diffraction-limited fluorescent spots per raw image may be approximately equal to 15 and the number K of raw images used to reconstruct one STORM image may be equal to 80 000.

SMLM image acquisition and processing is described, in particular, in Betzig, E. et al., "*Imaging intracellular fluorescent proteins at nanometer resolution*", Science (80-.), 313, 1642-1645 (2006). STORM image acquisition and processing is described, in particular, in Rust, M. J., Bates, M. & Zhuang, X. "*Sub-diffraction-limit imaging by stochastic optical reconstruction microscopy (STORM)*", Nat Methods 3, 793-795 (2006).

The resolution limit due to sampling has been defined in one early study as twice the mean distance between closest independent localizations. To achieve a given resolution denoted R, the Nyquist criterion yields a minimum number of fluorophore localizations denoted $N_{Nyq}(R)$. However, a recent reanalysis and comparisons with electron microscopy data concluded that at least five times more molecular localizations ($N_{5 \times Nyq}(R) = 5 \times N_{Nyq}(R)$) are in fact needed.

The large number of images ($K=N/\rho$) implied by the two above mentioned conditions makes single molecule localization microscopy inherently inefficient and slow, thereby limiting its potential for high-throughput imaging, where many fields of view (FOVs) of a field of study are to be imaged, and for imaging live cell dynamics. As a result, most single molecule localization microscopy studies have been limited to analyzing a small number of cells (typically less than ten) and to live cell imaging of objects moving slowly compared to the acquisition time.

Multiple approaches have been explored to accelerate localization microscopy.

Using bright dyes with rapid switching kinetics, high power lasers and fast cameras makes it possible to minimize exposure time without losing signal to noise ratio, but reaching sub-millisecond exposure remains challenging, and intense irradiation exacerbates phototoxicity and photobleaching in live cell imaging reducing the observation period.

Another approach is to increase the number p of active fluorophore appearing as diffraction-limited fluorescent spots per image, making it possible to reduce the number K of images without reducing the number N of independent fluorophore localizations, and to apply localization algorithms that can handle overlapping fluorescent spots. However, these overlaps necessarily compromise detection precision of fluorophore localizations, implying that any gain in temporal resolution comes at the cost of degraded spatial resolution.

Accordingly, there is a need to improve the reconstruction of dense super-resolution images from raw images obtained by single molecule localization microscopy to decrease the overall process time and in particular the time needed for acquiring the raw images that are used to reconstruct the dense super-resolution images.

SUMMARY OF THE INVENTION

Faced with these constraints and limitations, the inventors provide a method, a device, and a computer program for improving the reconstruction of dense super-resolution images from diffraction-limited images acquired by single molecule localization microscopy.

It is a broad object of the invention to remedy the shortcomings of the prior art as described above.

According to a first aspect of the invention there is provided a computer method for reconstructing at least one synthetic dense super-resolution image from at least one low-information-content image, the method comprising the steps of:

obtaining at least one low-information-content image;
inputting the at least one obtained low-information-content image to an artificial neural network, and
obtaining a synthetic dense super-resolution image from the artificial neural network, wherein the artificial neural network has been trained with training data comprising triplets of sparse localization images obtained from sequences of diffraction-limited images acquired by single molecule localization microscopy, at least partially corresponding low-resolution wide-field images, and corresponding dense super-resolution images, as a function of a training objective function comparing dense super-resolution images and corresponding outputs of the artificial neural network.

In particular, the claimed method makes it possible to reconstruct synthetic dense super-resolution images, for example synthetic dense SMLM images, of about the same quality as dense super-resolution images, for example dense SMLM images, reconstructed according to standard algorithms, for example dense SMLM images reconstructed according to STORM image processing, with a much smaller number of raw images leading to a much shorter period of acquisition. The reconstructed sparse localization image may be a reconstructed sparse SMLM image.

According to embodiments, the at least one low-information-content image comprises a sparse localization image reconstructed from a sequence of diffraction-limited images according to single molecule localization microscopy image processing.

According to embodiments, the method further comprises the steps of obtaining a sequence of diffraction-limited images; and
reconstructing the sparse localization image from the obtained sequence of diffraction-limited images.

According to embodiments, the at least one low-information-content image comprises a low-resolution wide-field image.

According to embodiments, the low-resolution wide-field image corresponds at least partially to the diffraction-limited images used for reconstructing the sparse localization image.

According to embodiments, the method further comprises a step of computing an error map, the error map representing a probability of errors to occur as a function of locations in the synthetic dense super-resolution image.

According to embodiments, the step of computing the error map comprises a step of generating a low-resolution image from the synthetic dense super-resolution image, the generated low-resolution image being compared with the low-resolution wide-field image inputted into the artificial neural network.

According to embodiments, the step of generating a low-resolution image is carried out in a low-resolution estimator network.

According to embodiments, the low-resolution estimator network comprises a plurality of convolutional layers.

According to embodiments, the method further comprises a step of learning of the low-resolution estimator network.

According to embodiments, the training objective function comprises at least one parameter to select a subset of the training data to be inputted into the artificial neural network According to embodiments, the training objective function comprises at least one of an objective function based on the L1 norm, on the L2 norm, on dice coefficients, and on an artificial neural network of the generative adversarial network type or of the conditional generative adversarial network type.

According to embodiments, the training objective function comprises at least one of an objective function based on an artificial neural network of the conditional generative adversarial network type and wherein the low-resolution wide-field image inputted into the artificial neural network is used as a condition of the conditional generative adversarial network.

According to embodiments, the low-resolution wide-field image input into the artificial neural network is a diffraction-limited image obtained via a fluorescence microscope.

According to a second aspect of the invention there is provided a computer method for reconstructing at least one synthetic dense super-resolution image from a sequence of diffraction-limited images acquired by single molecule localization microscopy, the method comprising the steps of:

obtaining a sequence of diffraction-limited images acquired by single molecule localization microscopy;
reconstructing a sparse localization image from the obtained sequence of diffraction-limited images according to single molecule localization microscopy image processing;
inputting the reconstructed sparse localization image to an artificial neural network, and
obtaining a synthetic dense super-resolution image from the artificial neural network, wherein the artificial neural network has been trained with training data comprising pairs of sparse localization images and corresponding dense super-resolution images, as a function of a training objective function comparing dense super-resolution images and corresponding outputs of the artificial neural network.

In particular, the claimed method makes it possible to reconstruct synthetic dense super-resolution images, for example synthetic dense SMLM images, of about the same quality as dense super-resolution images, for example dense SMLM images, reconstructed according to standard algorithms, for example dense SMLM images reconstructed according to STORM image processing, with a much smaller number of raw images leading to a much shorter period of acquisition. The reconstructed sparse localization image may be a reconstructed sparse SMLM image.

According to embodiments, the single molecule localization microscopy is photo-activated localization microscopy (PALM), stochastic optical reconstruction microscopy (STORM), or point accumulation for imaging in nanoscale topography (PAINT).

According to embodiments, the obtained sequence of diffraction-limited images comprises less than 300 diffraction-limited images, each of the diffraction-limited images comprising between 1 to 100 fluorophore localizations.

According to embodiments, at least one of the dense super-resolution images used to train the artificial neural network is built from a sequence of at least 30,000 diffraction-limited images acquired by single molecule localization microscopy.

According to embodiments, the diffraction-limited images of the obtained sequence correspond to a first field of view of a field of study, the steps of obtaining a sequence of diffraction-limited images, reconstructing a sparse localization image from the obtained sequence of diffraction-limited images, inputting the reconstructed sparse localization image to the artificial neural network, and obtaining a synthetic dense super-resolution image from the artificial neural network being repeated for at least one second field of view of the field of study, the first and the second fields of view being different.

According to embodiments, the first field of view and the second field of view are contiguous within the field of study, the method further comprising a step of creating a resulting image by stitching synthetic dense super-resolution images obtained from the artificial neural network.

Accordingly, the method of the invention enables super-resolution imaging of large field of study comprising many fields of view, in particular super-resolution imaging of hundreds of cells on time scales commonly used to image just a few cells.

According to embodiments, the diffraction-limited images of the obtained sequence correspond to a predetermined field of view, the steps of obtaining a sequence of diffraction-limited images, reconstructing a sparse localization image from the obtained sequence of diffraction-limited images, inputting the reconstructed sparse localization image to the artificial neural network, and obtaining a synthetic dense super-resolution image from the artificial neural network being repeated periodically for the same field of view.

Accordingly, the method of the invention enables high throughput imaging facilitating dynamic super-resolution imaging, in particular dynamic super-resolution imaging in live cells, without requiring higher excitation power or suffering from additional phototoxicity and photobleaching, thereby allowing faster and longer live cell super-resolution imaging without excessive photodamage.

According to embodiments, the artificial neural network comprises an encoder network and a decoder network, the encoder network comprising a plurality of convolution layers and of down-sampling layers and the decoder network comprising a plurality of deconvolution layers and of up-sampling layers. The artificial neural network may be of the U-net type.

According to embodiments, the method further comprises a step of training the artificial neural network.

According to embodiments, the method further comprises a step of pairing sparse localization images and corresponding dense super-resolution images for training the artificial neural network. This step of pairing sparse localization images and corresponding dense super-resolution images may comprise:
  obtaining a training sequence of diffraction-limited images acquired by single molecule localization microscopy;
  reconstructing a plurality of sparse localization images from first sub-sets of the obtained training sequence of diffraction-limited images according to a single molecule localization microscopy image processing; and
  reconstructing a plurality of dense super-resolution images from second sub-sets of the obtained training sequence of diffraction-limited images according to a single molecule localization microscopy image processing, each of the second sub-sets comprising more diffraction-limited images than each of the first sub-sets.

According to embodiments, the step of pairing sparse localization images and corresponding dense super-resolution images comprises:
  initializing simulation conditions;
  simulating evolution of the simulation conditions;
  building a dense super-resolution image from a result of the simulating step; and
  building a plurality of sparse localization images from the built dense image.

Accordingly, the method of the invention makes it possible to verify the quality of the reconstructed synthetic dense super-resolution images.

According to embodiments, the method further comprises a step of building additional sparse localization images by transforming at least one sparse localization image of the plurality of sparse localization images. The step of transforming at least one sparse localization image may comprise adding noise to at least one sparse localization image, rotating at least one sparse localization image, cropping at least one sparse localization image, modifying at least one sparse localization image, modifying the intensity scale of at least one sparse localization image, shearing at least one sparse localization image, and/or applying an elastic deformation to at least one sparse localization image. This makes it possible to increase the number and the variability of the images to be used for training artificial neural network.

According to embodiments, the training objective function comprises at least one of an objective function based on the L1 norm, on the L2 norm, on dice coefficients, and on an artificial neural network of the generative adversarial network type or of the conditional generative adversarial network type.

According to a third aspect of the invention there is provided an apparatus comprising means configured for carrying out each step of the method described above. The third aspect of the present invention has advantages similar those of the first and/or second above-mentioned aspects.

Since parts of the present invention can be implemented in software, parts of the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

In an embodiment, the computer code exploits graphic processing units (GPU) that allow parallel processing of large matrix data.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Further advantages of the present invention will become apparent upon examination of the drawings and detailed description. It is intended that any additional advantages be incorporated herein.

Figure 1:
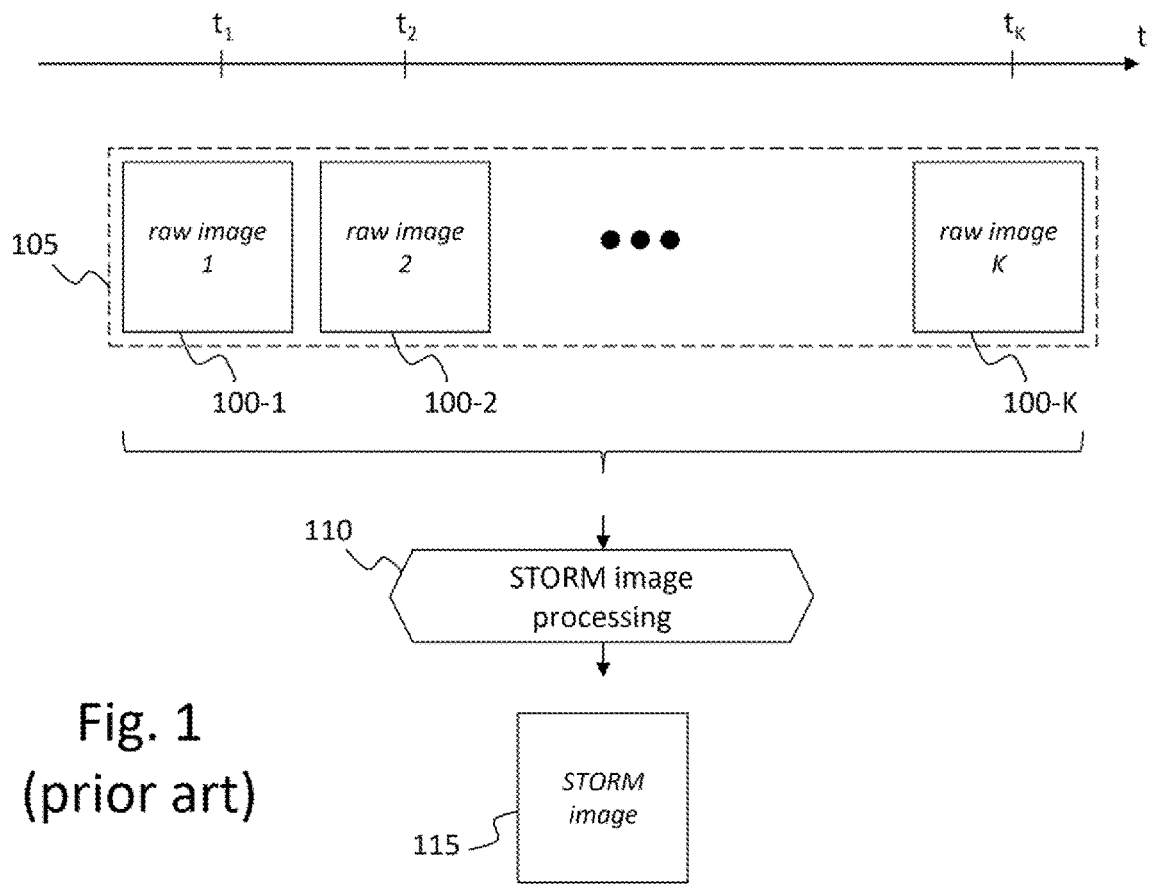
Figure 19:
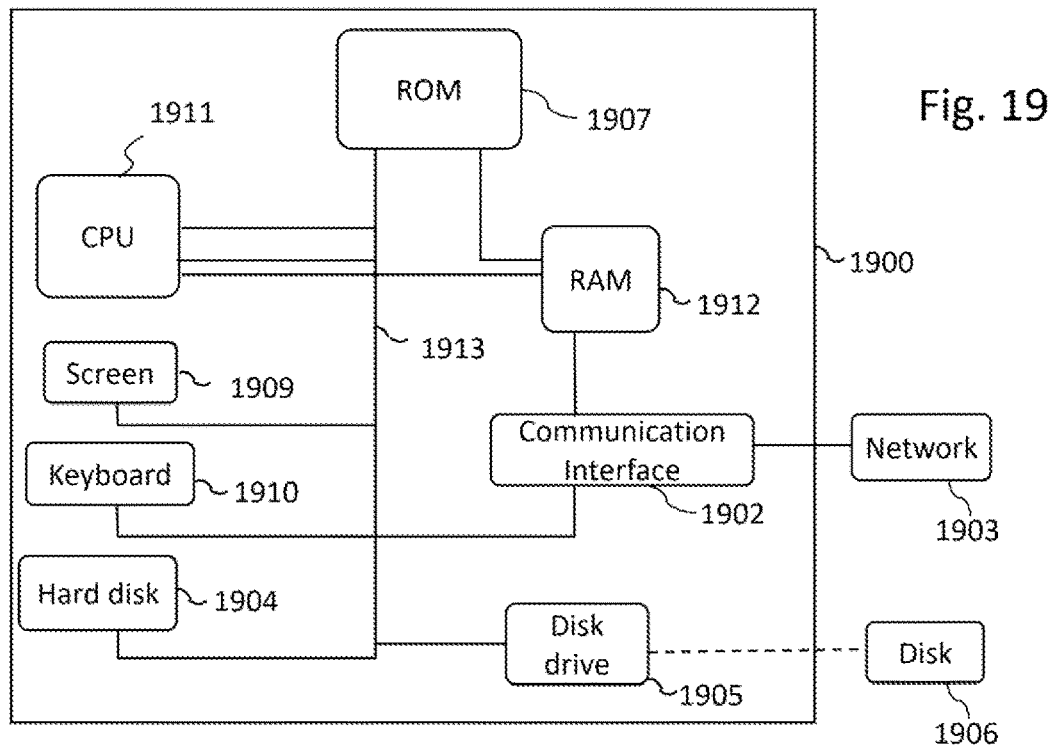
Figure 2:
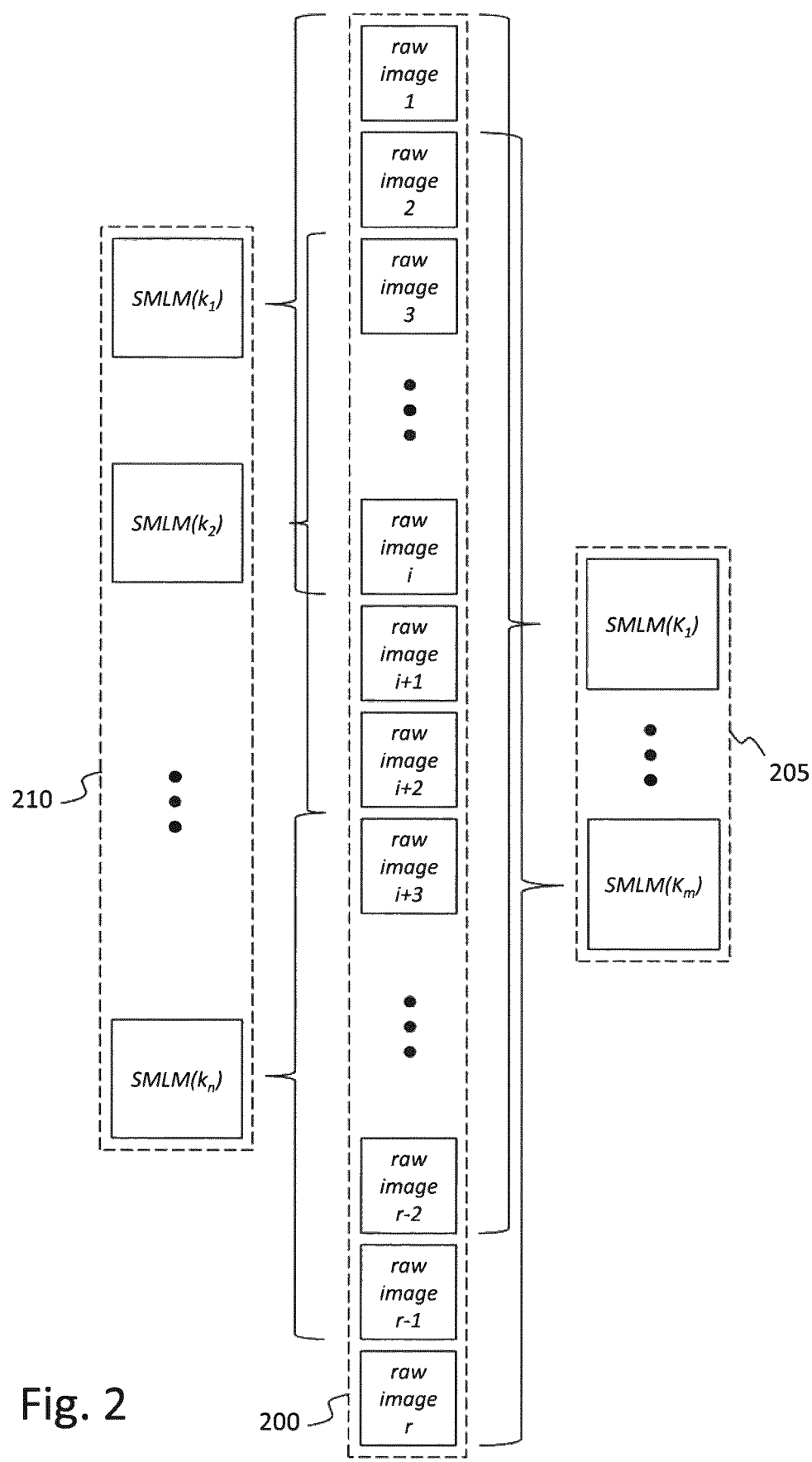
Figure 3:
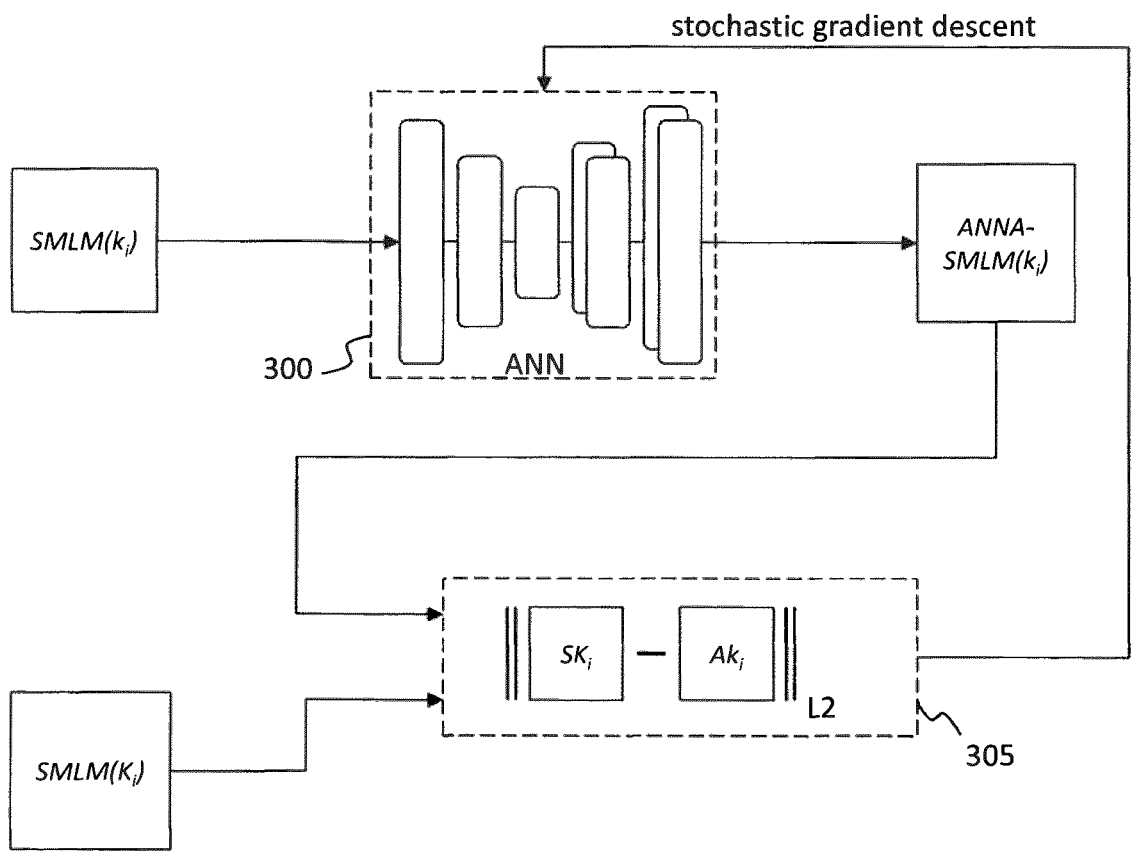
Figure 4:
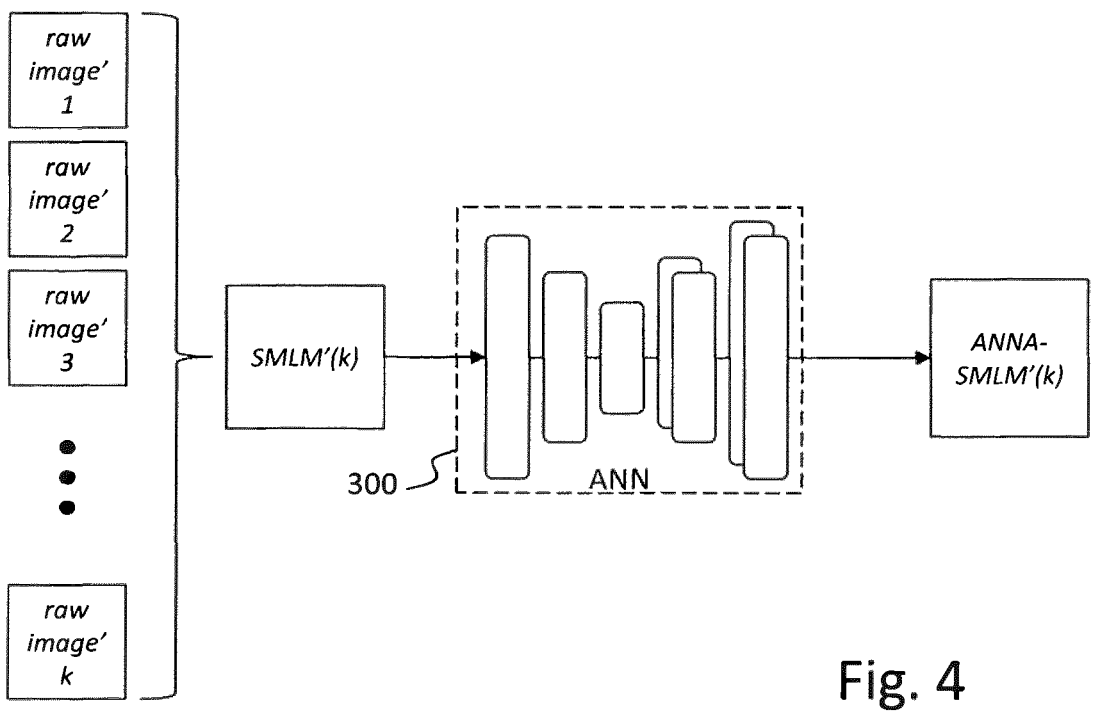
Figure 5:
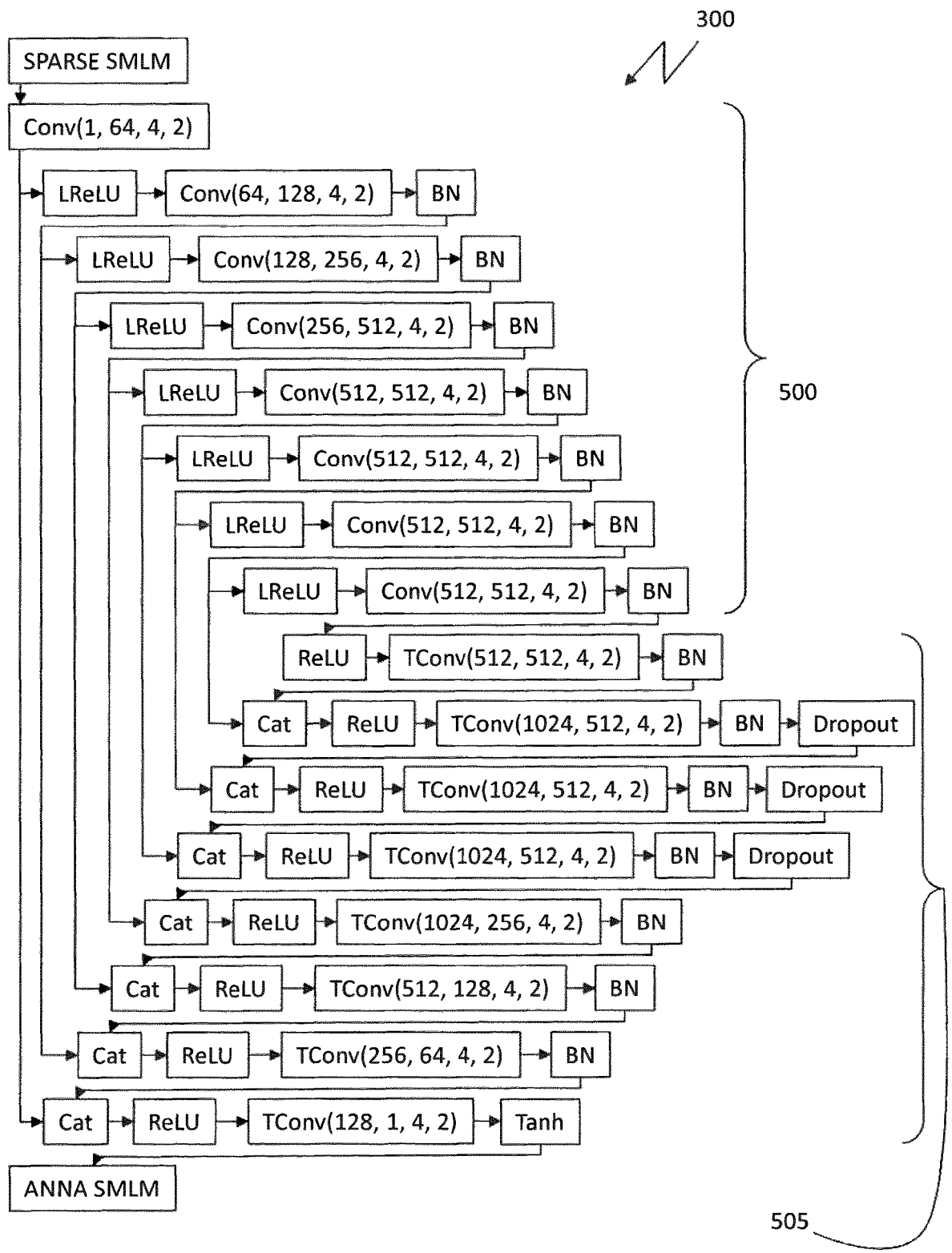
Figure 6:
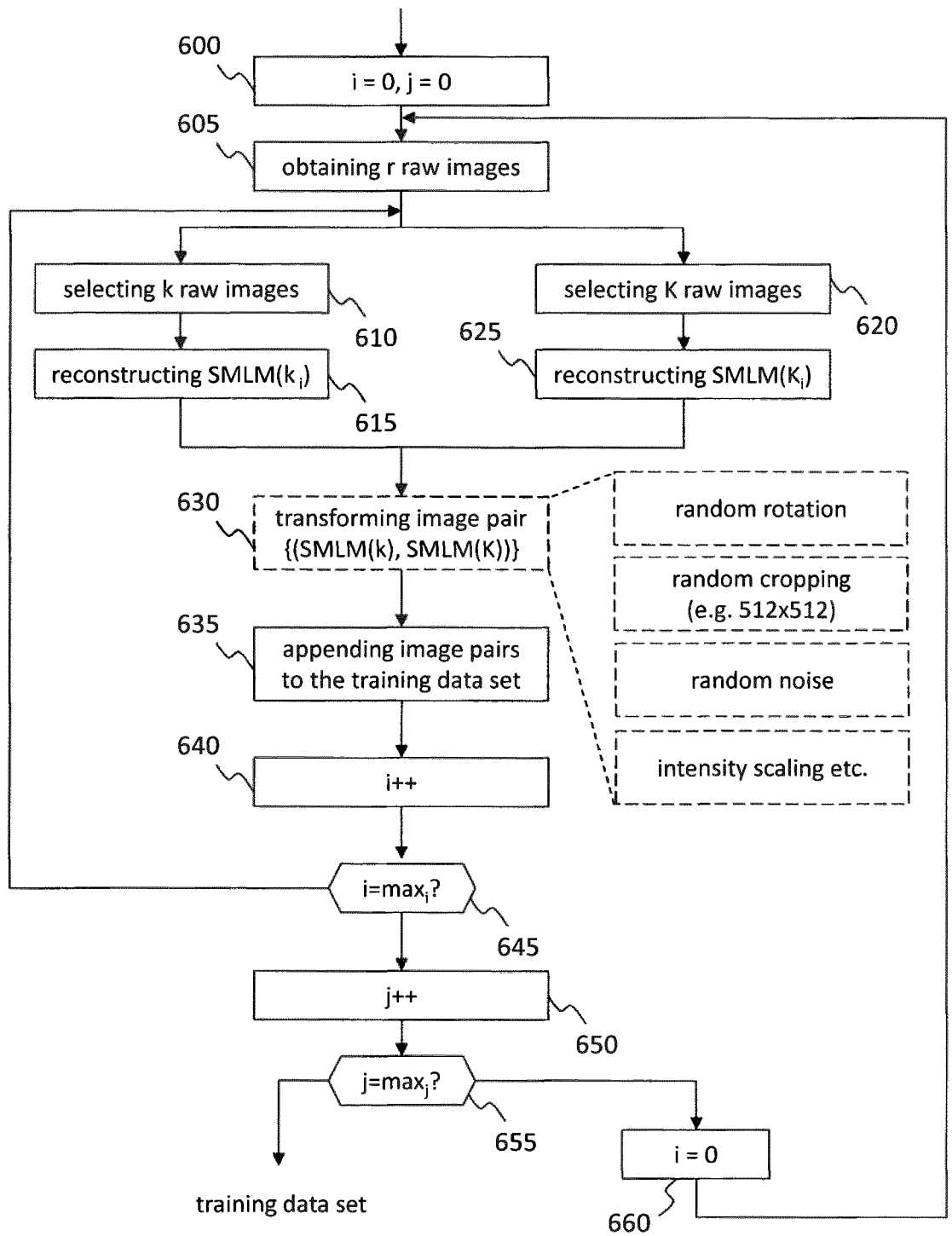
Figure 7:
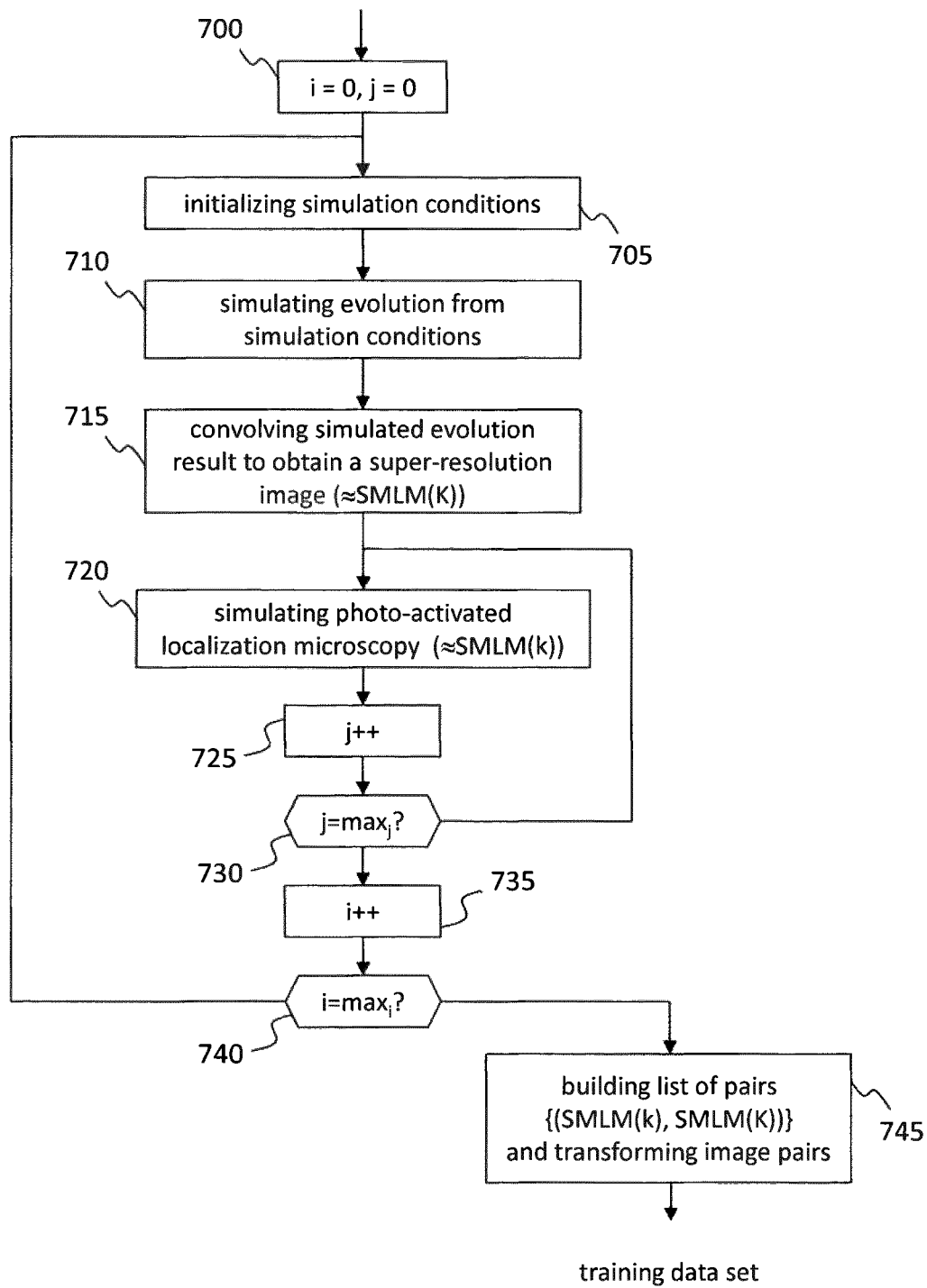
Figure 8:
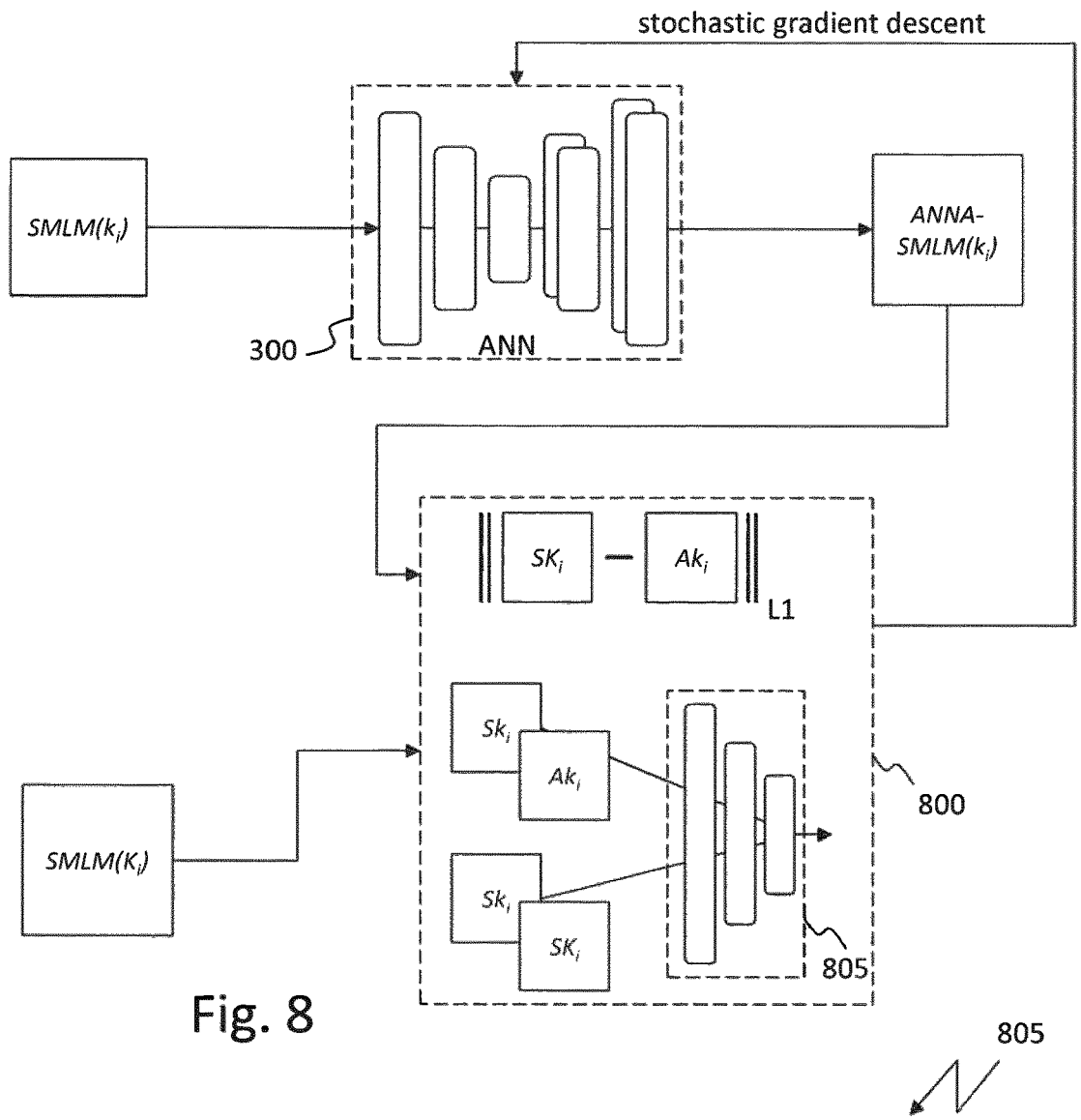
Figure 9:
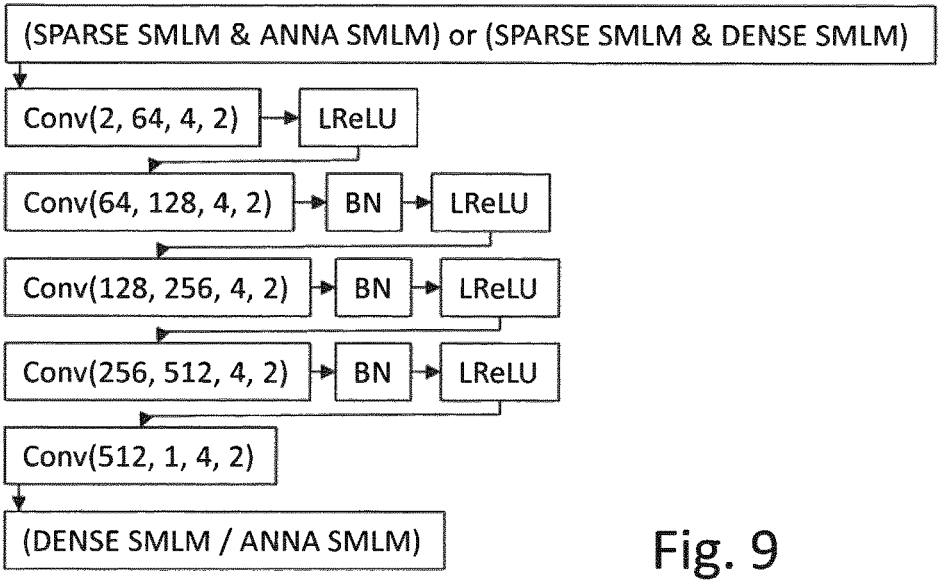
Figure 10A:
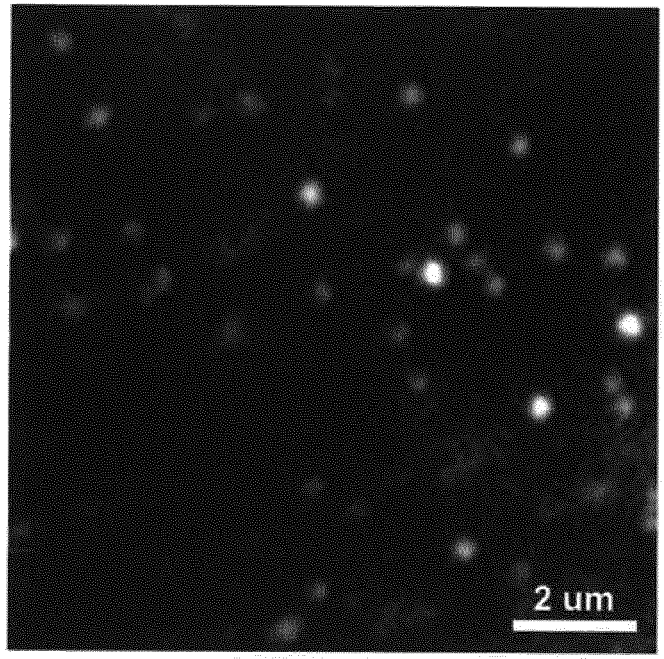
Figure 10B:
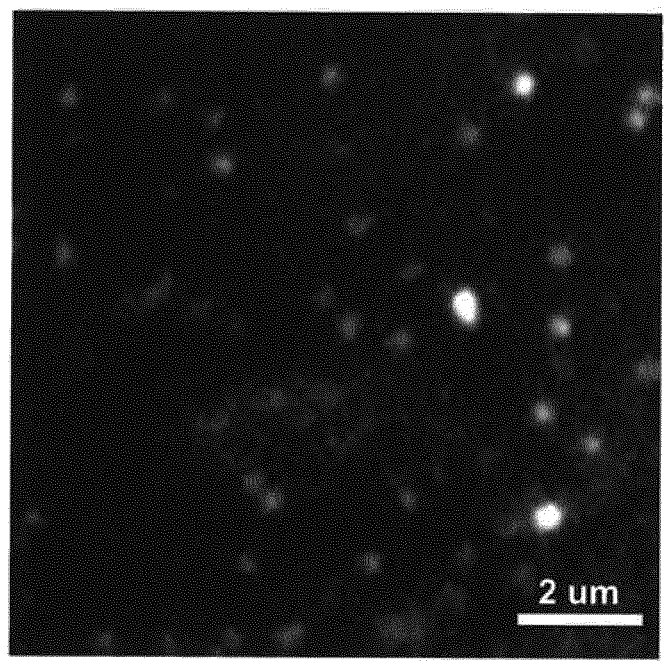
Figure 15:
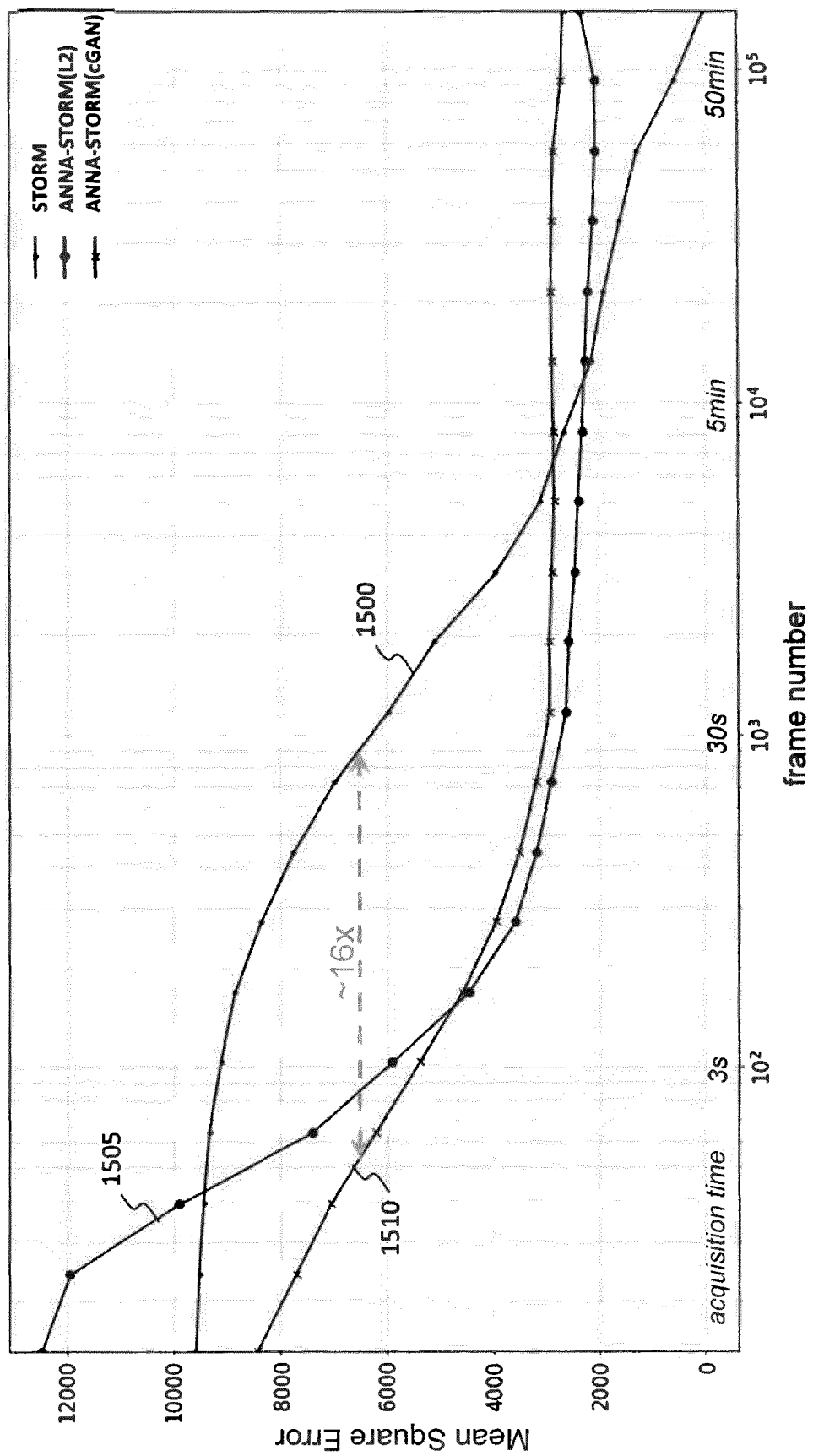
Figure 16:
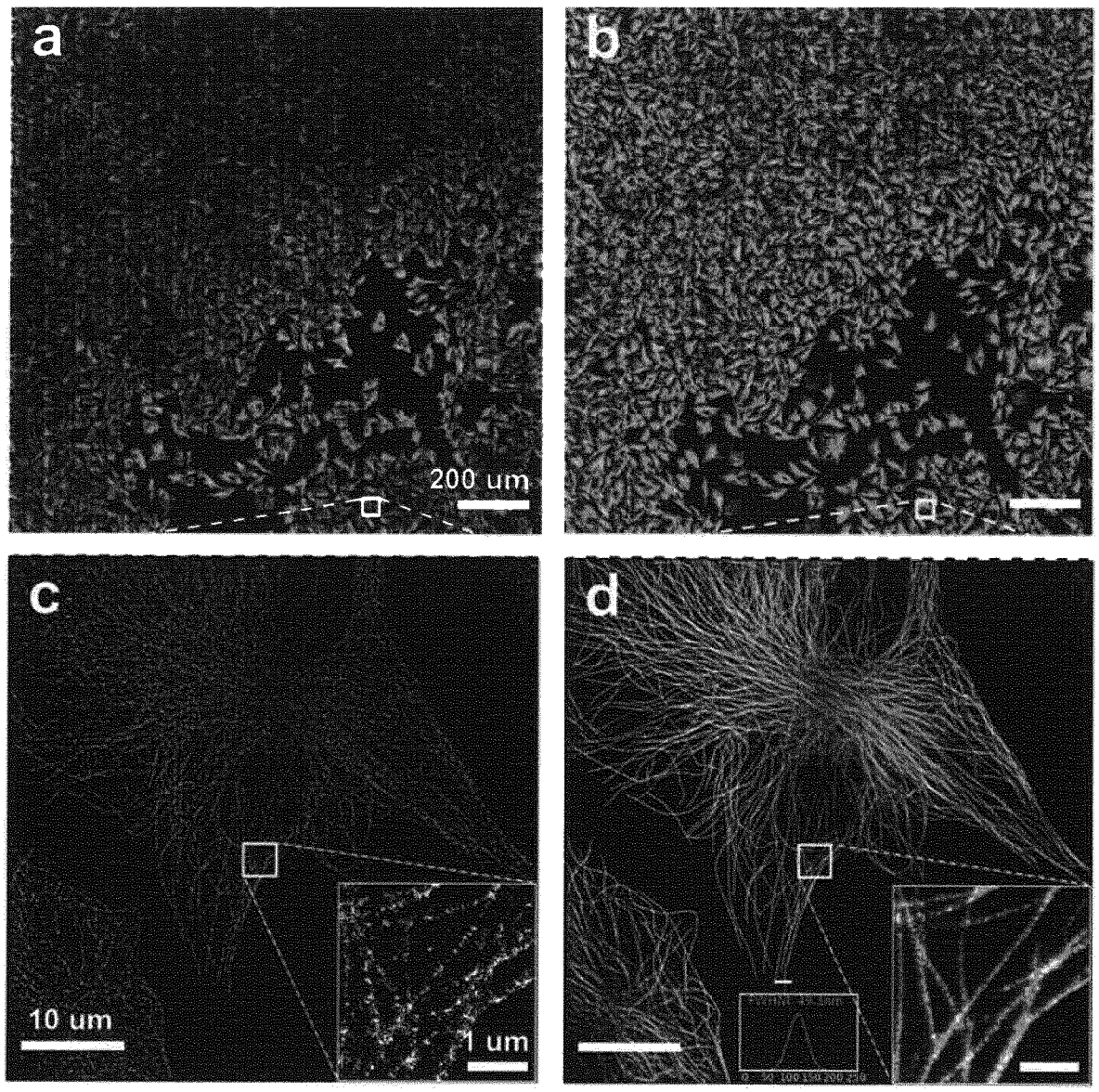
Figure 17:
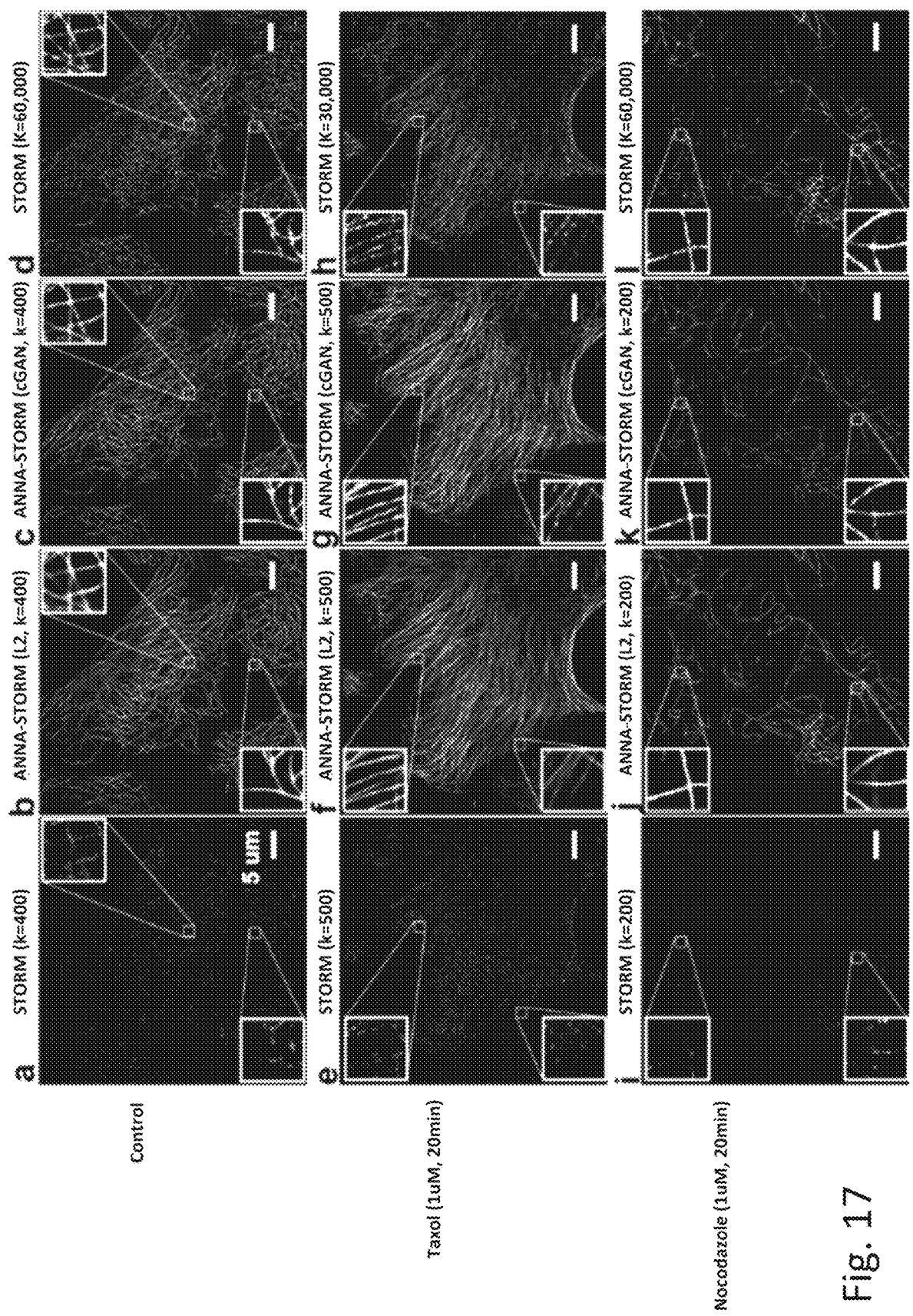
Figure 18:
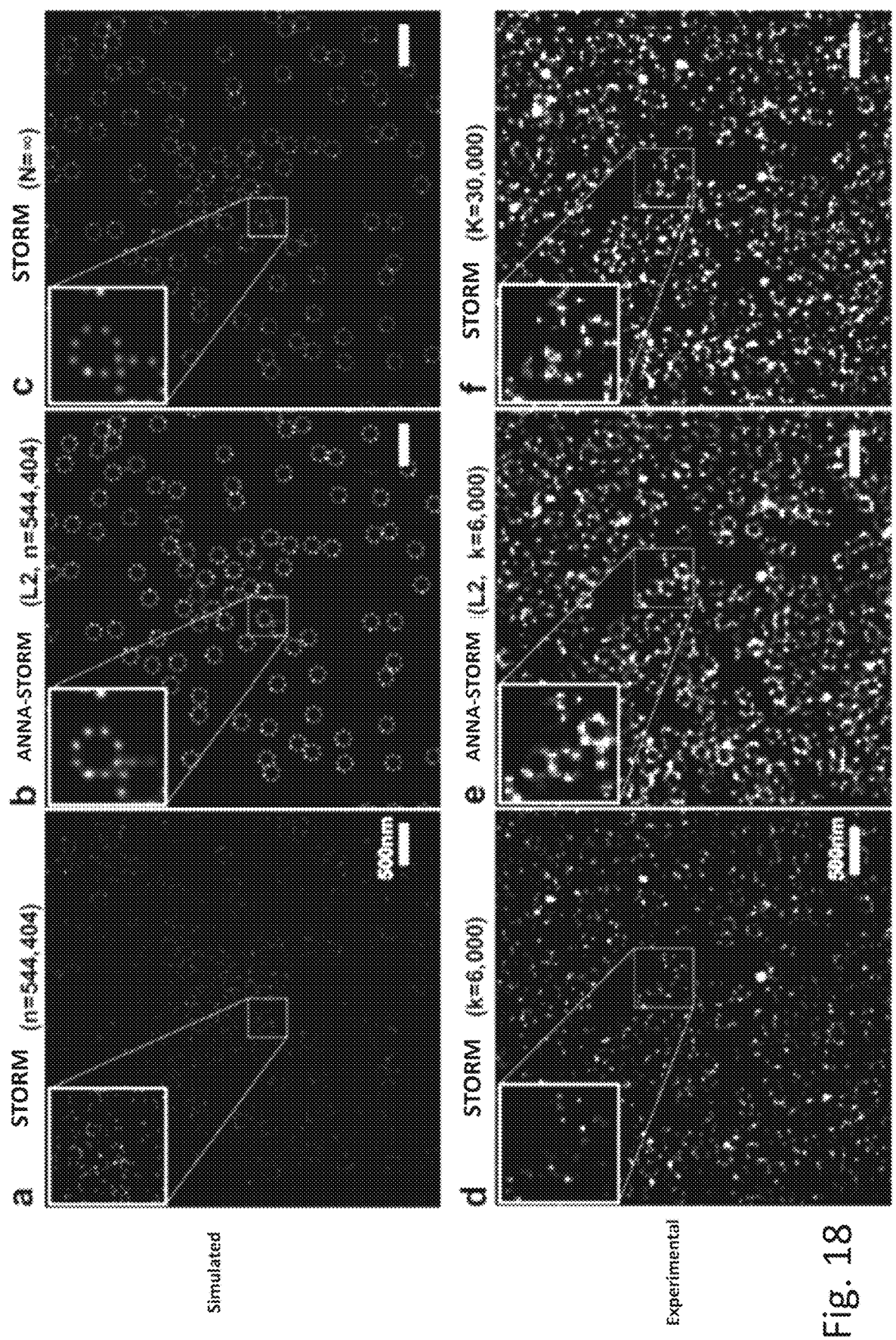
Figure 20:
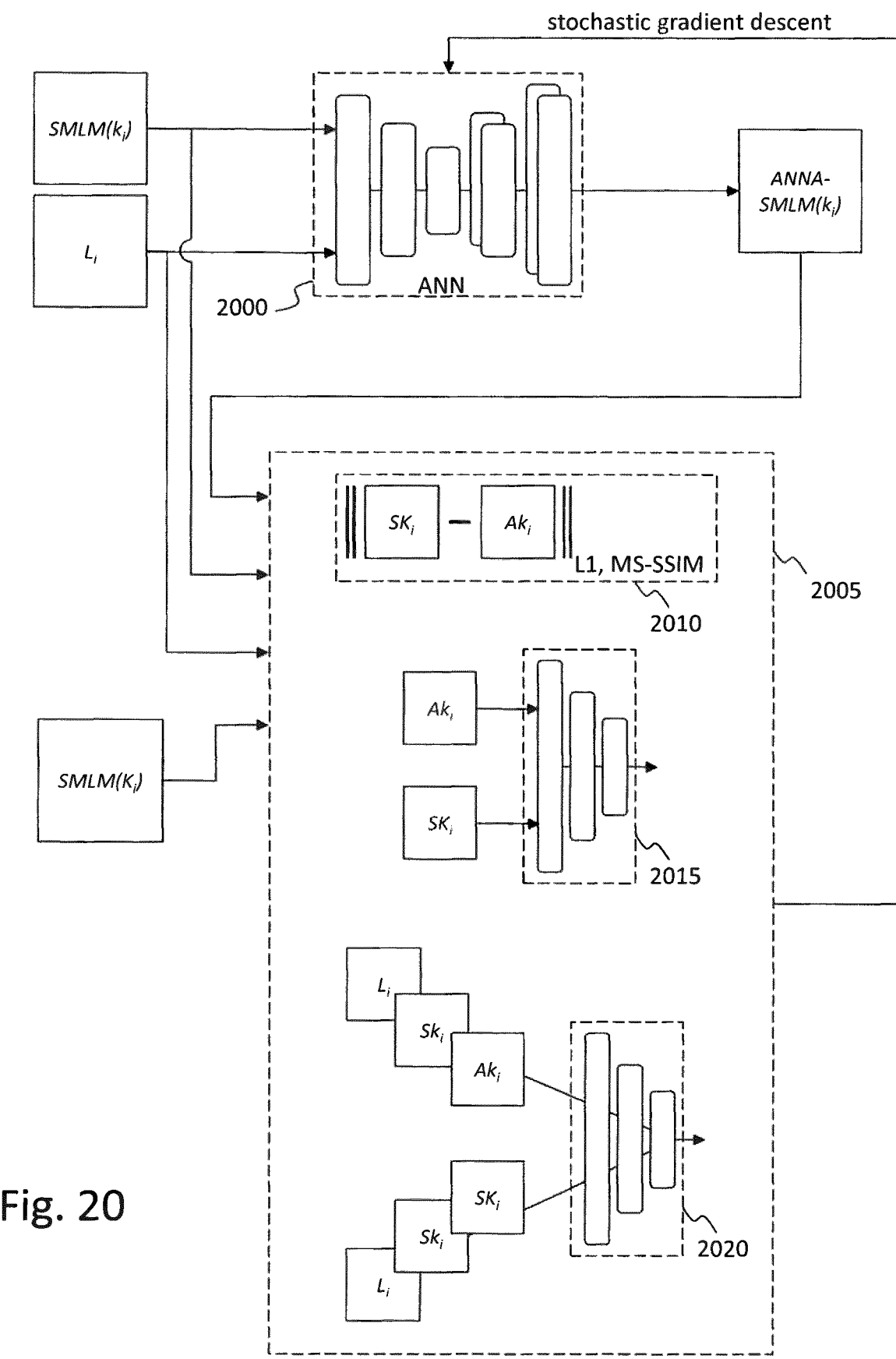
Figure 21:
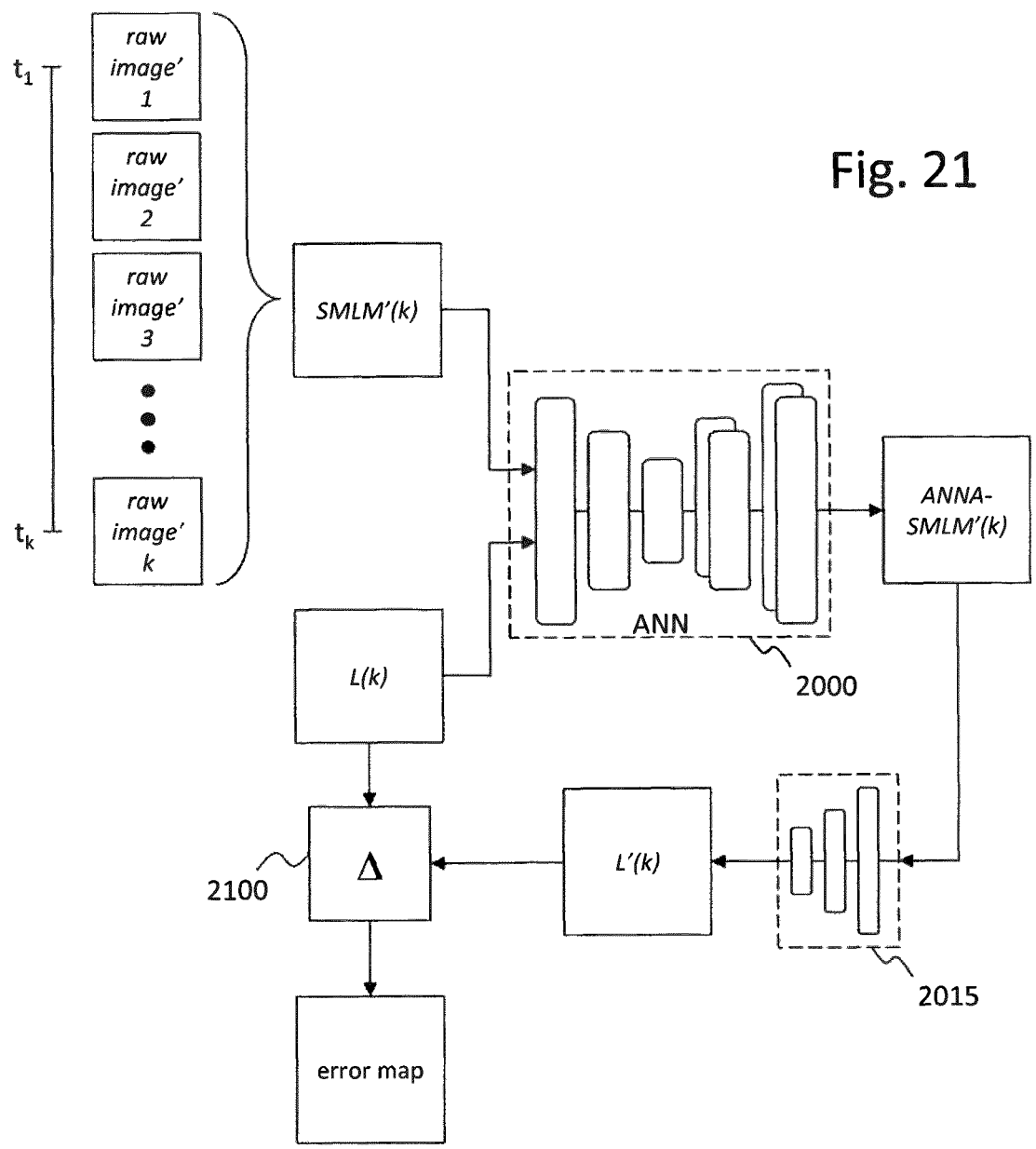
Figure 22:
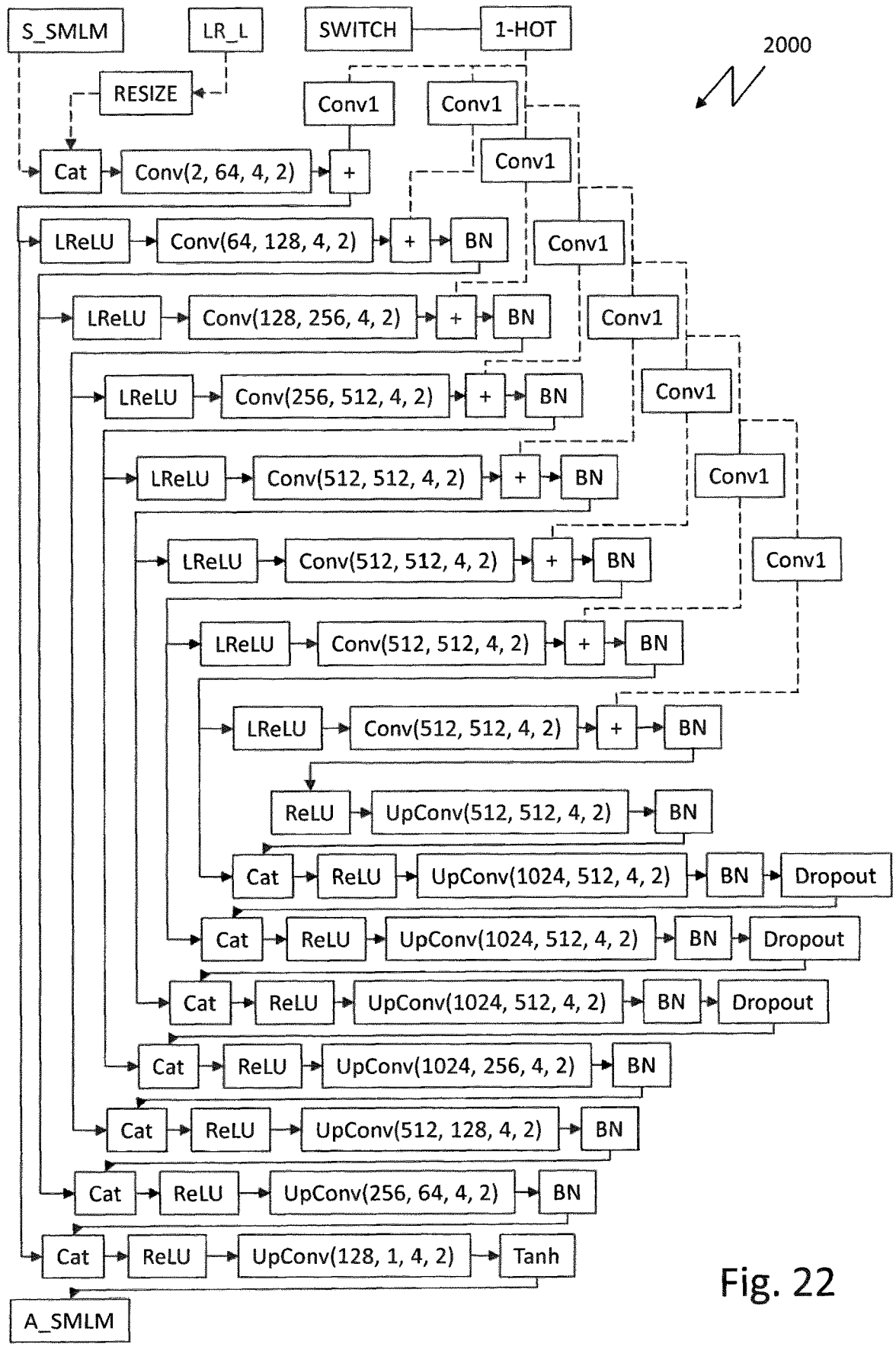
Figure 23:
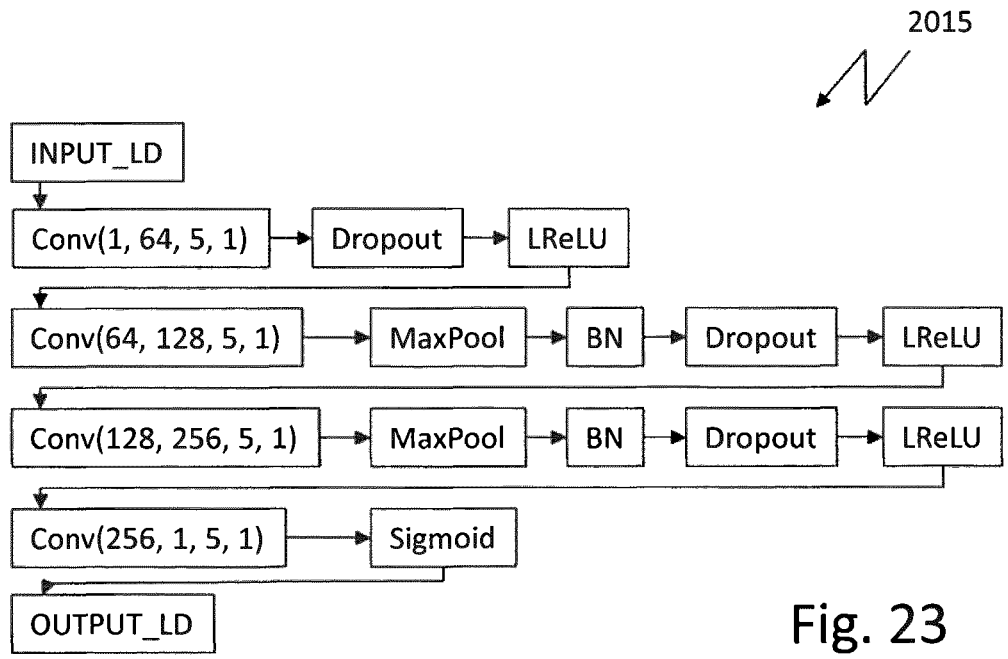
Figure 24:
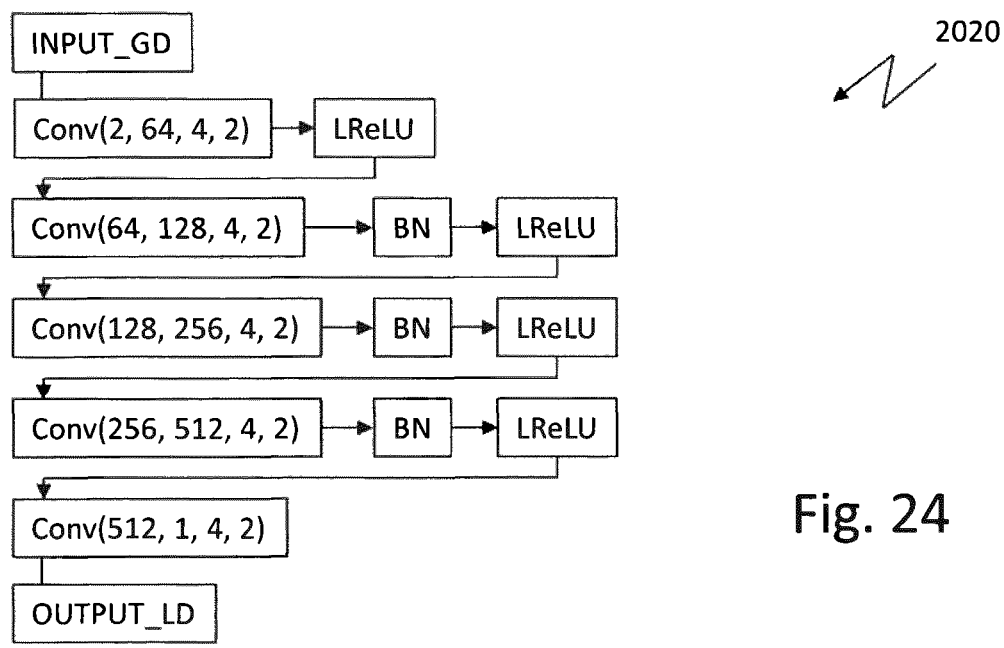
Figure 25:
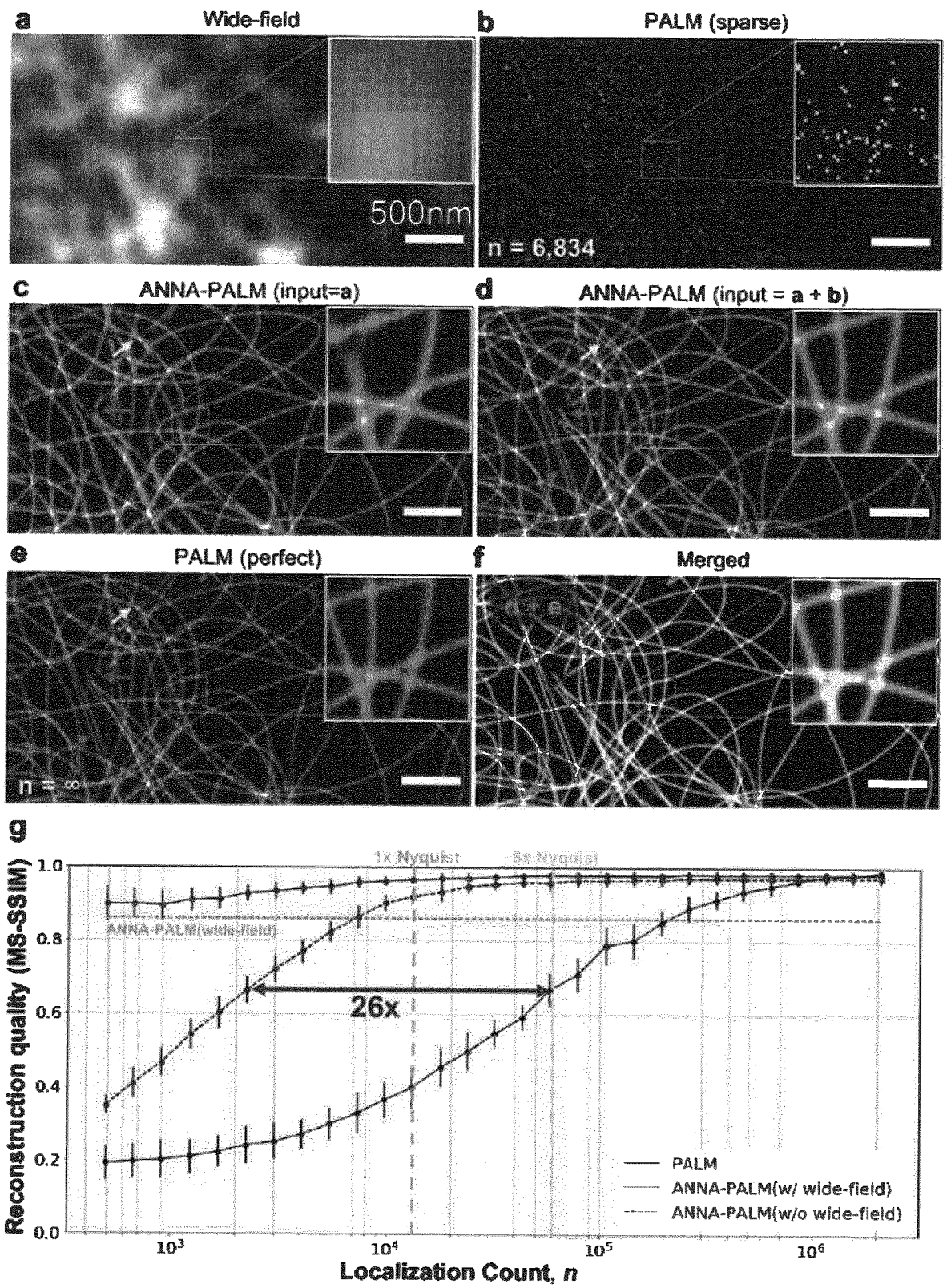

Embodiments of the invention will now be described, by way of example only, and with reference to the following drawings in which:

FIG. 1 illustrates the reconstruction of a dense super-resolution image from diffraction-limited images (or raw images) each comprising a low number of active fluorophore appearing as diffraction-limited fluorescent spots, taking as an example the STORM image processing;

FIG. 2 illustrates a first embodiment of a method for reconstructing sparse SMLM images and dense SMLM images from a set of raw images to create a training data set;

FIG. 3 illustrates schematically a first example of the architecture of a system for training an artificial neural network to be used for reconstructing synthetic dense SMLM images from raw images acquired by single molecule localization microscopy, based on the use of the L2 norm;

FIG. 4 illustrates schematically a first example of the architecture of a system for reconstructing synthetic dense SMLM images, from raw images acquired by single molecule localization microscopy, using an artificial neural network trained according to embodiments of the invention;

FIG. 5 illustrates an example of architecture for the artificial neural network illustrated in FIGS. 3 and 4;

FIG. 6 illustrates a first example of steps for creating images to be used for training the artificial neural network represented in FIG. 3, according to which created images are based on experimental results;

FIG. 7 illustrates a second example of steps for creating images to be used for training the artificial neural network represented in FIG. 3, according to which created images are based on simulation;

FIG. 8 illustrates schematically a second example of the architecture of a system for training an artificial neural network to be used for reconstructing synthetic dense SMLM images from raw images acquired by single molecule localization microscopy, based on cGAN/L1 loss;

FIG. 9 illustrates an example of architecture of a discriminator network used during the training phase of the artificial neural network illustrated in FIG. 8;

FIGS. 10a and 10b illustrate an example of raw images acquired by single molecule localization microscopy;

FIG. 11a illustrates an example of a sparse SMLM image reconstructed by STORM image processing from 250 raw images;

FIG. 11b represents a zoom of a portion of the image in FIG. 11a;

FIG. 12a illustrates an example of a dense SMLM image reconstructed by STORM image processing from 149,687 raw images;

FIG. 12b represents a zoom of a portion of the image in FIG. 12a;

FIG. 13a illustrates an example of a synthetic dense SMLM image reconstructed according to embodiments of the invention after the artificial neural network used has been trained with the L2 loss, as described by reference to FIG. 3;

FIG. 13b represents a zoom of a portion of the image in FIG. 13a;

FIG. 14a illustrates an example of a synthetic dense SMLM image reconstructed according to embodiments of the invention after the used artificial neural network has been trained with the cGAN/L1 loss, as described by reference to FIG. 8;

FIG. 14b represents a zoom of a portion of the image in FIG. 14a;

FIG. 15 illustrates the mean square error as a function of the image (frame) number or acquisition time between ANNA-STORM or STORM images and the ground truth, as defined by the dense STORM image, depending on the L2 and cGAN/L1 losses;

FIG. 16, comprising FIGS. 16a to 16d, illustrates the use of embodiments of the invention to high throughput imaging of a 1.8 mm×1.8 mm area containing many hundreds of cells;

FIG. 17, comprising FIGS. 17a to 17l, illustrates the robustness of embodiments of the invention to experimental perturbations;

FIG. 18, comprising FIGS. 18a to 18f, illustrates the use of embodiments of the invention to different biological structures;

FIG. 19 is a block diagram illustrating components of a processing device in which embodiments of the invention may be at least partially implemented;

FIG. 20 schematically illustrates a third example of the architecture of a system for training an artificial neural network to be used for reconstructing synthetic dense SMLM images from raw images acquired by single molecule localization microscopy;

FIG. 21 schematically illustrates a second example of the architecture of a system for reconstructing synthetic dense SMLM images, from raw images acquired by single molecule localization microscopy and from low-resolution wide-field images, using an artificial neural network trained according to embodiments of the invention;

FIG. 22 illustrates an example of the architecture of the generator network illustrated in FIG. 20;

FIG. 23 illustrates an example of the architecture of the low-resolution estimator network illustrated in FIG. 20;

FIG. 24 illustrates an example of the architecture of the cGAN discriminator network illustrated in FIG. 20; and FIG. 25 to 28 illustrate examples of the use of the embodiments of the invention as described by reference to FIGS. 20 to 24.

DETAILED DESCRIPTION OF EMBODIMENTS OF THE INVENTION

For the sake of illustration, the following description is based as whole on STORM image processing. However, it is to be understood that the invention applies to other methods for reconstructing dense super-resolution images from diffraction-limited images (also called raw images) acquired by single molecule localization microscopy (SMLM), for example PALM image processing and PAINT imaging. PALM image processing, STORM image processing, and PAINT image processing are generically referred to as single molecule localization microscopy imaging.

According to embodiments, the total number N of independent fluorophore localizations is reduced, without increasing the number p of activated fluorophore appearing as diffraction-limited fluorescent spots per raw image, thereby reducing the total number K of acquired raw images ($K=N/p$), in comparison to standard single molecule localization microscopy image processing methods.

Indeed, it has been observed that it is possible to build high quality dense super-resolution images from vastly under-sampled localization microscopy data by taking advantage of the structural redundancy of most biological images.

According to embodiments, deep learning, a branch of machine learning that employs artificial neural networks (ANNs), is used to learn complex non-linear mappings between numerical inputs and outputs and thus, to build synthetic dense super-resolution images (also referred to as ANNA-SMLM images (artificial neural network accelerated SMLM images), synthetic dense SMLM images, synthetic dense images, synthetic images, or ANNA-STORM images if corresponding raw images are acquired by STORM) from raw images acquired by single molecule localization microscopy.

The invention makes it possible to reconstruct a synthetic dense SMLM image of approximately similar information content as a standard dense super-resolution image (or dense SMLM image) (with K images and N fluorophore localizations) from a much smaller number k of raw images (k<<K) without changing the average density of localizations, ρ, i.e. from a much smaller number of fluorophore localizations (n=ρ×k<<ρ×K=N).

The information content obtained from a given image, acquired for example by SMLM or wide-field microscopy, can be quantified with mutual information (MI). MI measures the mutual dependence between two random variables: the image of the biological structure and the observed image in an experiment. For example, the more frame of raw images are used to reconstruct a SMLM image, the higher the MI value is and the more information about the underlying biological structure is contained in the SMLM image. On this basis, the "sparse localization image" or "low-resolution wide-field image" defined bellow are considered as "low-information-content images", whereas the "dense super-resolution image" and "synthetic dense super-resolution image" are considered as "high-information-content images".

FIG. 2 illustrates a first embodiment of a method for reconstructing sparse SMLM images (also referred to as sparse images) and dense SMLM images from a set of raw images to create a training data set (or a training data subset).

As illustrated, a set 205 of dense SMLM images generically denoted SMLM(K) is reconstructed from a set 200 of raw images acquired by single molecule localization microscopy, for example by stochastic optical reconstruction microscopy image processing. The set 205 of dense SMLM images may comprise from one to several tens of dense SMLM images. Each dense SMLM is built from a set of K raw images according to a standard method, for example STORM image processing, the value K being predetermined or being determined dynamically. The value K is typically comprised between several thousands of raw images to several hundreds of thousands of raw images.

The set 200 of raw images advantageously comprises more than K raw images so that different dense SMLM images can be reconstructed. Alternatively, al the raw images of the set 200 are used to reconstruct one dense SMLM image.

As described here after by reference to FIGS. 6 and 7, several sets of raw images can be used to create a training data set.

Similarly, a set 210 of sparse SMLM images generically denoted SMLM($k_j$) is reconstructed from the set 200 of raw images acquired by single molecule localization microscopy. The set 210 of sparse SMLM images may comprise from several hundreds to several tens of thousands of images, for example 20,000. Each sparse SMLM image is reconstructed from a set of k raw images (k being very small in comparison with K (k<<K), for example 100 times smaller) according to a standard method, for example STORM image processing, the value k being predetermined or being determined dynamically. The method used to reconstruct the sparse SMLM images is preferably the same as the one used for reconstructing each of the dense SMLM images. The value k is typically comprised between several tens of raw images to several hundreds of raw images.

As described above, the STORM image processing may be based, for example, on the following steps as a whole:

a detection step that determines the number and approximate location of fluorescent spots at the raw image pixel level. Typically, this is done by a thresholding of some kind of smoothed version of the raw image and identification of connected components;

a localization step that computes the position of each fluorophore more precisely, with subpixel and sub-diffraction precision. This is often done by fitting a model of the point spread function to the image, for example using maximum likelihood estimation (MLE); and a rendering step for reconstructing a dense STORM image from a list of coordinates (x,y) resulting from the two previous steps. Typically, this rendering is done by displaying a 2D histogram of localizations, using a grid of bins (pixels) that are smaller than the expected resolution (typically something like 10 nm or 20 nm).

It may be used for reconstructing both sparse SMLM images and dense SMLM images.

According to embodiments, each sparse SMLM image SMLM($k_j$) is paired with each dense SMLM image SMLM($K_i$), for a set of raw images, to create training data {(SMLM($k_j$), SMLM($K_i$))}.

FIG. 3 illustrates schematically a first example of the architecture of a system for training an artificial neural network to be used for reconstructing synthetic dense SMLM images from raw images acquired by single molecule localization microscopy, based on the use of the L2 norm.

As illustrated, sparse SMLM images SMLM(k) and dense SMLM images SMLM(K) as determined for example according to the method described by reference to FIG. 2, 6, or 7, are used to train artificial neural network 300.

Sparse SMLM images SMLM(k) are used as inputs of artificial neural network 300 that may be considered as a generator network that outputs synthetic dense SMLM images denoted ANNA-SMLM, while dense SMLM images SMLM(K), corresponding to the desired outputs, are compared with the outputs of artificial neural network 300, to adapt the parameters (typically weights and biases) of the latter accordingly, for example using a stochastic gradient descent algorithm to minimize iteratively a loss error that measures how well real outputs match desired outputs. Such steps of adapting parameters of artificial neural network 300 are called the learning or training phase.

According to embodiments, each pair of the training set of data is used at least once during the training phase.

For example, after SMLM($k_i$) has been input into artificial neural network 300, the result, denoted ANNA-SMLM($k_i$) ($Ak_i$ in short), is compared with the corresponding desired result SMLM($K_i$) ($Sk_i$ in short) to compute an error that is used to correct the parameters of artificial neural network 300.

The error between the output of artificial neural network 300 and the corresponding desired output is computed in module 305. According to the embodiment illustrated in FIG. 3, the parameters of artificial neural network 300 are adjusted according to the L2 loss that measures the mean square error (L2 norm) between an obtained result ($Ak_i$) and the corresponding desired result ($Sk_i$).

As described hereinafter by reference to FIG. 5, artificial neural network 300 may be of the U-net type, for example a U-net containing 16 convolutional layers and about 55 million parameters. U-nets are special types of convolutional neural networks consisting as a whole of a 'down-sampling' (encoder) network connected to an 'up-sampling' (decoder) network, which contain layer-skipping connections between encoder and decoder feature maps of equal size. Layer-skipping connections enable accurate, pixel-wise mappings for tasks that require preservation of local information, such as image restoration, for example segmentation or inpainting.

Artificial neural networks of the U-net type are described, for example, in the article entitled "*U-net: Convolutional networks for biomedical image segmentation*", Ronneberger, O., Fischer, P. & Brox, T., Medical Image Computing and Computer-Assisted Intervention—MICCAI 2015. Lecture Notes in Computer Science, 9351, 234-241 (Springer International Publishing, 2015).

FIG. 4 illustrates schematically a first example of the architecture of a system for reconstructing synthetic dense SMLM images, from raw images acquired by single molecule localization microscopy, using an artificial neural network trained according to embodiments of the invention.

As illustrated, a sparse SMLM image SMLM'(k) is obtained from a set of k raw images, denoted raw image' 1 to raw image' k, acquired by single molecule localization microscopy. It is used as input to artificial neural network 300 that outputs a corresponding synthetic dense SMLM image denoted ANNA-SMLM'(k).

As described above, sparse SMLM image SMLM'(k) is preferably obtained from the set of raw images according to the same image processing method as the one used for obtaining sparse SMLM images to create the training data set, for example the STORM image processing.

FIG. 5 illustrates an example of architecture for the artificial neural network illustrated in FIGS. 3 and 4.

According to this example, artificial neural network 300 comprises an encoder network and a decoder network with skip connections. It is a U-net with 16 convolutional layers and 54,408,832 parameters. Its inputs and outputs are image patches containing (256m)×(256m) pixels, where m is an integer. The input is a sparse SMLM image (denoted SPARSE SMLM), for example a sparse STORM image, and the output is a synthetic dense SMLM image of the same size (denoted ANNA SMLM).

The encoder network contains multiple convolutional layers, alternating with down-sampling layers (resulting from the use of a convolution layer with a stride set to two), stacked on top of each other, resulting in feature maps of halving size and doubling number. The decoder network contains multiple convolutional layers (for applying a transposed convolution also called a deconvolution) alternating with up-sampling layers (resulting again from the use of a transpose convolution layer with a stride sets to two), that result in feature maps of doubling size and halving number. The U-net is approximately symmetric and the last layer of the decoder network produces an output image of identical size as the input image fed to the encoder network.

According to such an embodiment, convolution layers with a stride of two (instead of max pooling layers) are used (unlike the original U-net). Moreover, rectified linear unit layers are preferably replaced by leaky rectified linear unit layers in the encoder.

As described above, U-nets contain direct connections between feature maps located symmetrically in the encoder and decoder. These feature maps, which have identical size, are concatenated in the corresponding layers of the decoder. The skip-layer connections allow the network to combine local, pixel-wise information, with the larger context information that is propagated through consecutive convolutional layers.

As illustrated in the example of FIG. 5, encoder 500 comprises 8 convolutional layers, each of the layers carrying out a 2D convolution denoted Conv(a, b, c, d) where, a is the input feature map number, for example the value 1 may indicate that the input is encoded on a predetermined number of bits on one channel;

b is the output feature map number, for example the value 64 may indicate that the output is encoded on a predetermined number of bits on 64 channels;

c corresponds to the kernel size, for example the value 4 may indicate that a 4×4 convolution kernel is used. The convolution kernel is adjusted during the learning phase; and d defines the stride or moving step of the convolution kernel, for example the value 2 reduces the output size by half.

The second to the eighth layers comprise a leaky rectified linear unit denoted LReLU, which applies the following activation function, to the output of the previous layer: $x \rightarrow \max(x, 0) + \min(\varepsilon x, 0)$ with for example $\varepsilon=0.2$ As illustrated, a batch normalization denoted BN is preferably applied to the output of the convolution for each of the second to the eighth layers to normalize the data.

Likewise, decoder 505 comprises 8 convolutional layers, each of the layers carrying out a 2D deconvolution or transposed convolution denoted TConv(a, b, c, d) where the meaning of a, b, c, and d is the same as that of the convolution described by reference to the convolution layers of the encoder.

As illustrated, the data to be processed in each of the deconvolution units are previously processed in a rectified linear unit denoted ReLU for applying the following function:

$$x \rightarrow \max(x, 0)$$

Regarding the first layer of decoder 505, the input of the rectified linear unit corresponds to the output of the last layer of the encoder. Regarding the other layers of decoder 505, the input of the rectified linear units corresponds to the output of the previous layer of the decoder that is concatenated with the output of a symmetrical layer of the encoder (the output of the first layer of the decoder being concatenated with the output of the second last layer of the encoder, the output of the second layer of the decoder being concatenated with the output of the third last layer of the encoder, and so on as illustrated in FIG. 5) in a concatenation unit denoted Cat.

A batch normalization (BN) is preferably applied to the output of each of the deconvolution units, except for that of the last layer, to normalize the data and a dropout layer (denoted Dropout) having, for example, a dropout probability equal, for example, to 0.5, is used at the output of the batch normalization of the second, third, and fourth layers of the decoder to prevent the network from overfitting and improving its performance on new data.

The output of the deconvolution unit of the last layer enters a hyperbolic tangent unit denoted Tanh to obtain the output of the U-net.

According to the example illustrated in FIG. 3, training of artificial neural network 300 is based on the mean square error between an obtained result and the corresponding desired result.

For the sake of clarity in the given formulae, a sparse SMLM input image is denoted S, the corresponding dense SMLM image (e.g. a dense STORM image), i.e. the desired output (or target) of artificial neural network 300 is denoted T, and the real output of artificial neural network 300, i.e. the synthetic dense SMLM image, is denoted A= $\mathcal{F}$ (S), where $\mathcal{F}$ designates artificial neural network 300. Therefore, images S, T and A $\mathcal{F}$ correspond to images SMLM(k), SMLM(K), and ANNA-SMLM(k), respectively.

Use of the mean square error (MSE) between an obtained result and the corresponding desired result, often used for training artificial neural networks, penalizes the MSE between network output and target:

$$\mathcal{L}_{L2}(\mathcal{F}) = \mathbb{E}_{(S,T) \sim p_{data}(S,T)} \|A-T\|_{L2} = \mathbb{E}_{(S,T) \sim p_{data}(S,T)} \|\mathcal{F}(S)-T\|_{L2}$$

where $\mathbb{E}$ denotes expectation;

$p_{data}(S,T)$ is the joint probability density of pairs of sparse and super-resolution images from the training data set; and $\|A-T\|_{L2}$ is the L2 norm, i.e. the root mean square error between images A and T:

$$\|A-T\|_{L2} = (\Sigma\Sigma_{i,j}(A(i,j)-T(i,j))^2)^{1/2}$$

Artificial neural network 300 is trained to minimize this loss function:

$$\mathcal{F}^* = argmin_{\mathcal{F}} \mathcal{L}_{L2}(\mathcal{F})$$

According to embodiments, artificial neural network 300 is trained end-to-end using stochastic gradient descent (SGD), for example as described in the article entitled "A method for stochastic optimization", Kingma, D. P. & Ba, J. Adam, 2014, and a mini-batch size of 5 with a number of iterations (backpropagation steps) ranging from 80,000 to 120,000.

FIG. 6 illustrates a first example of steps for creating images to be used for training artificial neural network 300 of FIG. 3, according to which created images are based on experimental results.

A first step (step 600) aims at initializing indexes i and j to zero. Index i is associated with pairs of sparse SMLM images SMLM(k) and dense SMLM images SMLM(K) and index j is associated with the sets of raw images used to reconstruct sparse and dense SMLM images.

Next, a set of r raw images is obtained (step 605), r being chosen large enough to make it possible to reconstruct high quality dense SMLM images (e.g. r being chosen from 10,000 to 200,000 for STORM imaging), i.e. to make it possible to choose k and K so that r≥K>>k. These raw images may be acquired directly by single molecule localization microscopy or from a memory where raw images acquired by single molecule localization microscopy have been stored.

Next, a number k of raw images is selected from the set of r raw images, the k raw images being preferably consecutive raw images (step 610), and a sparse SMLM image SMLM($k_i$) is reconstructed from the k selected raw images (step 615), for example according to STORM image processing.

In parallel, simultaneously or not, a number K of raw images is selected from the set of r raw images, the K raw images being preferably consecutive raw images (step 620), and a dense SMLM image SMLM($K_j$) is reconstructed from the K selected raw images (step 625), for example according to STORM image processing.

Next, a pair is formed from the reconstructed sparse SMLM image SMLM(k) and the dense SMLM image SMLM($K_j$) and several pairs are preferably generated from this formed pair (step 630). For the sake of illustration, this can be done by applying a random rotation (by a same random angle comprised between 0° to 360°) to each image of the pair, by random cropping (for example 512×512 pixels), by adding random noise, by modifying the intensity scale, and so on (other types of transformation such as shearing or elastic deformation can be used) in order to increase the number and the variability of the images to be used for training artificial neural network 300. In other words, a set of image transformations is applied on each image of the pair that has been formed for enhancing the training data set.

The pair that has been formed and the pairs that have been generated are then added to the training data set (step 635).

In following steps, i is incremented by one (step 640) and a test is performed to determine whether index i reaches a predetermined threshold denoted max (step 645).

Steps 610 to 640 are repeated until index i reaches this predetermined threshold to create further pairs (SMLM($k_i$); SMLM($K_j$)). It is to be noted here that the number r of raw images is preferably higher than the number K of raw images to be selected for reconstructing the dense SMLM images so that the latter vary.

Alternatively, only steps 610, 615, 630, 635, and 640 are repeated until index i reaches this predetermined threshold so that only one dense SMLM image SMLM(K) is reconstructed for all reconstructed sparse SMLM image formed from the same set of raw images.

Next, index j is incremented by one (step 650) and a test is performed to determine whether index j reaches a predetermined threshold denoted $max_j$ (step 655).

If index j has not reached the predetermined threshold $max_j$ index i is reset to zero (step 660), a new set of r raw images is obtained (step 605), and steps 610 to 645 are repeated.

For the sake of illustration, the maximum value for index i may be equal to 200, the maximum value for index j may be equal to 6, and the number of image transformations applied on the pairs that have been formed (step 630) may be equal to 100).

As an alternative, sparse SMLM images may be derived directly from dense SMLM images, for example by applying Poisson noise and/or noise obtained from other sources of noise.

FIG. 7 illustrates a second example of steps for creating images to be used for training artificial neural network 300 of FIG. 3, according to which created images are based on simulation.

After having initialized index i and j to zero (step 700), index i being associated with sparse SMLM images SMLM(k) and index j being associated with dense SMLM images SMLM(k), simulation conditions are initialized (step 705). For the sake of illustration, such a step of initializing simulation conditions may comprise initializing multiple polymer chains as random walk.

Next, the simulation is carried out by simulating the evolution of the simulation conditions according to predetermined laws (step 710). Still for the sake of illustration, the simulation may be directed to a Langevin dynamics simulation used to simulate the stochastic temporal evolution of multiple polymer chains.

The result of the simulation is then transformed into a dense SMLM image that preferably defines a probability density of localization events in a SMLM image (step 715), for example a STORM image. This image is considered as being the dense image SMLM(K) described above. Such a transformation can be done, for example, by convolving the result of the simulation (in particular if it comprises zero thickness curves) with a Gaussian kernel.

Next, sparse SMLM images comparable to sparse SMLM images SMLM(k) described above can be derived from the image obtained in the previous step (step 720). This can be done, for example, by applying Poisson noise and additional background noise. This step is repeated in order to obtain as many sparse images as desired (steps 725 and 730), i.e. until index j reaches a predetermined threshold, denoted $max_j$. Likewise, steps 705 to 730 are repeated, to obtain as many dense SMLM images as required and to obtain corresponding sparse images, i.e., until index i reaches a predetermined threshold denoted $max_j$ (740).

After having obtained sparse SMLM images and dense SMLM images, a list of pairs of sparse SMLM images and dense SMLM images is built (step 745). According to embodiments, each sparse SMLM image is associated with each dense SMLM image to form a pair.

Still according to particular embodiments, image transformations are applied to pairs of sparse SMLM images and dense SMLM images in order to increase the training data set and the variability of the data. Again, this can be done, for example, by applying a random rotation, by random cropping, by adding random noise, by modifying the intensity scale, and so on.

FIG. 8 illustrates schematically a second example of the architecture of a system for training an artificial neural network to be used for reconstructing synthetic dense SMLM images from raw images acquired by single molecule localization microscopy, based on cGAN/L1 loss.

A main difference between the architectures illustrated in FIG. 3 and in FIG. 8 lies in the objective function used for training artificial neural network 300.

According to the embodiment illustrated in FIG. 8, parameters of artificial neural network 300 are adjusted as a function of a cGAN loss that combines adversarial generator and discriminator losses with a weighed sum of the L1 norm between an obtained result and the corresponding desired result, denoted 800.

Generative adversarial networks (GAN) and conditional adversarial networks (cGAN) are known artificial neural networks described, for example, in the articles entitled "*Generative Adversarial Nets*", Goodfellow, I. at al., 2672-2680 (2014) and "*Image-to-Image Translation with Conditional Adversarial Networks*", Isola, P., Zhu, J.-Y., Zhou, T. & Efros, A. A. (2016).

Computation on the cGAN loss is based on generative adversarial networks (GAN) that can learn to generate new samples from real image distributions based on a set of observed examples. Discriminator network 805 takes a sparse SMLM image SMLM(k) (Sk in short) and the corresponding real or synthetic dense SMLM image as input, i.e. a dense SMLM image SMLM(K) (SK in short) or an output ANNA-SMLM(k) of artificial neural network 300 (Ak in short), and outputs the probability that the image (SMLM(K) or ANNA-SMLM(k)) is real or synthetic.

Artificial neural network 300, considered here as a generator network, and discriminator network 805 are trained simultaneously, the discriminator trying to tell apart real from synthetic data and the generator trying to fool the discriminator.

FIG. 9 illustrates an example of architecture of discriminator network 805 used during the training phase of artificial neural network 300 in FIG. 8.

The input of the discriminator network is a pair of images. The first input image is a sparse SMLM image originating from experimental fluorophore localization data or from simulation data as described by reference to FIGS. 6 and 7. The second image is either the output of artificial neural network 300 (using the first input image as input) or a dense SMLM image obtained from SMLM image processing, for example STORM image processing, or obtained from simulation. The output of the discriminator network is a small image whose pixels correspond to image patches of the input images. The pixel values are large when the discriminator network believes that the patch corresponds to a dense SMLM image obtained from SMLM imaging or obtained from simulation and small when it believes that the patch corresponds to an image produced by artificial neural network 300.

According to embodiments, discriminator network 805 has 5 convolutional layers and 2,764,544 parameters. Its input are two (256m)×(256m) pixel image patches (the sparse SMLM image and either its ANNA-SMLM reconstruction or the corresponding dense SMLM image) and its output is a (30m)×(30m) image whose pixel values indicate whether the corresponding input patch is real or generated, where m is an integer. The second, third, and fourth convolutional layers are followed by batch normalization. Again, activation functions are leaky rectified linear units that may be expressed as follows:

$$x \to \max(x,0) + \min(\varepsilon x, 0) \text{ with } \varepsilon = 0.2$$

The notation of the convolution units, leaky rectified linear units, and batch normalization units of FIG. 9 are similar to those described by reference to FIG. 5.

Again, it is considered that a sparse SMLM input image is denoted S, the corresponding dense SMLM image (e.g. a dense STORM image), i.e. the desired output of artificial neural network 300 is denoted T, and the real output of artificial neural network 300 is denoted $A = \mathcal{G}(S)$, where $\mathcal{G}$ designates the generator, i.e. artificial neural network 300. Again, images S, T and A corresponds to images SMLM(k), SMLM(K), and ANNA-SMLM(k), respectively.

The objective function used in the embodiment illustrated in FIG. 8 draws from recent work on generative adversarial networks (GAN). In GANs, a generator network $\mathcal{G}$ learns to transform random input vectors z (drawn from a probability density $p_z(z)$) into new samples of a data probability density $p_{data}(x)$. According to the embodiment illustrated in FIG. 8, the data samples x are the dense SMLM images T. The generator network $\mathcal{G}$ learns by working against a discriminator network $\mathcal{D}$ D that simultaneously learns to discriminate between original data samples and samples generated by generator network $\mathcal{G}$. Adversarial training thus consists in playing a minmax game such that $$(\mathcal{G}^*, \mathcal{D}^*) = \operatorname{argmin} \mathcal{G} \max \mathcal{D} \mathcal{L}_{GAN}(\mathcal{G}, \mathcal{D})$$

with an objective function of the following form:

$$\mathcal{L}_{GAN}(\mathcal{G}, \mathcal{D}) = \mathbb{E}_{x \sim p_{data}(x)} \log[\mathcal{D}(x)] + \mathbb{E}_{z \sim p_z(z)} \log[1 - \mathcal{D}(\mathcal{G}(z))]$$

or equivalently by simultaneous optimization of the two following coupled loss functions:

$$\begin{cases} \mathcal{D}^* = \operatorname{argmax}_{\mathcal{D}}(\mathbb{E}_{x \sim p_{data}(x)} \log[\mathcal{D}(x)] + \mathbb{E}_{z \sim p_z(z)} \log[1 - \mathcal{D}(\mathcal{G}(z))]) \\ \mathcal{G}^* = \operatorname{argmin}_{\mathcal{G}}(\mathbb{E}_{z \sim p_z(z)} \log[1 - \mathcal{D}(\mathcal{G}(z))]) \end{cases}$$

It is to be noted that in a conditional GAN (cGAN), the generator and the discriminator networks have an extra input vector c which leads to the following objective function:

$$\mathcal{L}_{cGAN}(\mathcal{G}, \mathcal{D}) = \mathbb{E}_{(c,x) \sim p_{data}(c,x)} \log[\mathcal{D}(c,x)] + \mathbb{E}_{c \sim p_{data}(c), z \sim p_z(z)} \log[1 - \mathcal{D}(c, \mathcal{G}(z))]$$

such that the generator learns a conditional probability density $p_{data}(x|c)$.

According to the embodiment illustrated in FIG. 8, input c is the sparse SMLM image S. In addition to satisfying the cGAN objective, it is preferable to have artificial neural network 300 output images that are similar to the target images. Accordingly, an L1 penalty between the generator output and the target image has been added, weighted by a scalar coefficient μ=100 (L1 being preferred to L2 because it penalizes blurring).

The logarithmic losses described above may be replaced by least square losses that prove to give good results.

Accordingly, the optimization problem for adjusting the parameters of generator network $\mathcal{G}$ (i.e. artificial neural network 300) may be expressed as follows:

$$\begin{cases} \mathcal{D}^* = \mathrm{argmax}_{\mathcal{D}} \begin{bmatrix} \mathbb{E}_{S,T \sim p_{data}(S,T)}(\mathcal{D}(S,T)-1)^2 + \\ \mathbb{E}_{z \sim p_z(z), S \sim p_{data}(S)}(\mathcal{D}(S, \mathcal{G}(S,z)))^2 \end{bmatrix} \\ \mathcal{G}^* = \mathrm{argmin}_{\mathcal{G}} \begin{bmatrix} \mathbb{E}_{z \sim p_z(z), S \sim p_{data}(S)}(\mathcal{D}(S, \mathcal{G}(S,z))-1)^2 + \\ \mu \| \mathcal{G}(S,z) - T \|_{L1} \end{bmatrix} \end{cases}$$

FIGS. 10 to 14 illustrate the performance of the system illustrated in FIG. 4 after it has been trained according to the embodiments described by reference to FIGS. 3 and 8. For the sake of illustration, the system is tested on real images of immunolabeled microtubules. FIGS. 10a, 10b, 11a, 12a, 13a, and 14a illustrate examples of raw images, sparse STORM image, dense STORM image, and ANNA-STORM images obtained for the same field of view.

Still for the sake of illustration, training of artificial neural network 300 is based on six dense SMLM images, each obtained from STORM image processing from 60,000 raw images of microtubules (representing a 10 min sequence) and on approximately 20,000 sparse SMLM images each obtained from STORM image processing from 300 raw images selected among the same set as the one used for obtaining the dense SMLM images (representing a 7.5s sequence). The number of fluorophore localizations per raw image varies from approximately 3 to 25.

FIGS. 10a and 10b illustrate an example of raw images acquired by single molecule localization microscopy. Each image shows a small number of fluorophore localizations.

FIG. 11a illustrates an example of a sparse SMLM image reconstructed by STORM image processing from 250 (k=250) raw images. FIG. 11b represents a zoom of a small portion (region of interest) of the image illustrated in FIG. 11a.

While microtubule filaments can already be seen in this sparse STORM image, local structural details are hard to discern, making it difficult to follow the path of individual filaments and to identify local features such as filament crossings. This sparse STORM image has sub-optimal resolution as measured by the Nyquist criterion.

FIG. 12a illustrates an example of a dense SMLM image reconstructed by STORM image processing from 149,687 (K=149,687) raw images. FIG. 12b represents a zoom of a small portion (region of interest) of the image illustrated in FIG. 12a.

As can be seen, the image reconstructed from a huge number of raw images makes it possible to analyze details of the filaments.

FIG. 13a illustrates an example of a synthetic dense SMLM image (ANNA-SMLM image) reconstructed according to embodiments of the invention after artificial neural network 300 has been trained with the L2 loss objective function, as described by reference to FIG. 3.

The represented image is the output of artificial neural network 300 after inputting a sparse SMLM image obtained by STORM image processing from 250 (k=250) raw images, as shown in FIG. 11a.

FIG. 13b represents a zoom of a small portion (region of interest) of the image illustrated in FIG. 13a.

FIG. 14a illustrates an example of a synthetic dense SMLM image (ANNA-SMLM) reconstructed according to embodiments of the invention after artificial neural network 300 has been trained with the cGAN/L1 loss objective function, as described by reference to FIG. 8.

The represented image is the output of artificial neural network 300 after inputting a sparse SMLM image obtained by STORM image processing from 250 (k=250) raw images as shown in FIG. 11a.

FIG. 14b represents a zoom of a small portion (region of interest) of the image illustrated in FIG. 14a.

FIG. 15 illustrates the mean square error (MSE) as a function of the image (or frame) number (k) or acquisition time between synthetic dense STORM images (ANNA-STORM) or dense STORM images and the ground truth as defined by the dense STORM image with K=149,687 images, depending on the L2 and cGAN/L1 losses.

The curve denoted 1500 represents the mean square error between the standard STORM image (e.g. the STORM image represented in FIG. 11a), denoted STORM, and the ground truth (e.g. the dense STORM image represented in FIG. 12a).

Curve denoted 1505 represents the mean square error between the synthetic dense SMLM image (ANNA-SMLM) obtained according to embodiments of the invention while using the L2 loss for training artificial neural network 300 (e.g. the synthetic dense SMLM image represented in FIG. 13a), denoted ANNA-STORM(L2), and the ground truth (e.g. the dense STORM image represented in FIG. 12a).

The curve denoted 1510 represents the mean square error between the synthetic dense SMLM image (ANNA-SMLM) obtained according to embodiments of the invention while using the cGAN/L1 losses for training artificial neural network 300 (e.g. the synthetic super-resolution image represented in FIG. 14a), denoted ANNA-STORM(cGAN), and the ground truth (e.g. the dense STORM image represented in FIG. 12a).

As it is apparent from FIG. 15, embodiments of the invention make it possible to reconstruct synthetic dense SMLM images of about the same quality as dense SMLM images reconstructed according to standard algorithms, for example dense SMLM images reconstructed according to STORM image processing, from a much smaller number of raw images leading to a much shorter period of acquisition. As illustrated, reconstructing an ANNA-STORM(cGAN) image may require sixteen time less raw images and so be sixteen time shorter to acquire than reconstructing a standard dense STORM image (while the quality is about the same). This image or time ratio may vary depending on factors such as the type of imaged structure and the image noise, and the definition of the reconstruction error metric.

It is to be noted that while two different objective functions for training artificial neural network 300 have been described, other objective functions may be used. Moreover, several objective functions may be combined with each other to improve training of artificial neural network 300. In particular, it is possible to combine the use of cGAN with L1 norm as described above and to combine the use of cGAN with L2 norm.

It is also to be noted that other types and/or other architectures of artificial neural networks may be used.

The use of a computational method based on deep learning to reconstruct high quality super-resolution images from sparsely sampled, rapidly acquired, single molecule localization data, enables considerable gains in acquisition time compared to standard localization microscopy and (unlike other approaches) does not require higher fluorophore activation density, and hence does not compromise spatial resolution.

The drastic improvement in imaging efficiency afforded by embodiments of the invention alleviates the incompatibility between localization microscopy and high throughput imaging, and enables super-resolution imaging of hundreds of cells on time scales commonly used to image just a few cells. This facilitates super-resolution imaging studies of rare events, cellular heterogeneity and of partly stochastic structures such as cytoskeletal polymers or chromosomes, whose characterization requires statistics on many configurations. Embodiments of the invention are also applicable to high throughput imaging of large numbers of experimental conditions, e.g. drug treatments or gene knock-outs. In addition, they can be applied to imaging large samples at high resolution, by stitching together multiple images of spatially adjacent fields. For example, embodiments of the invention require only a few hours to generate images spanning nearly five orders of magnitude in scale, from about 2 mm down to about 20 nm. This capability could be well adapted to expansion microscopy, an alternative super-resolution technique that physically increases sample size, but often requires tiling many fields of view to image even a single cell. Thus, embodiments of the invention are adapted to multiscale super-resolution imaging.

Indeed, the drastic improvement in imaging efficiency afforded by embodiments of the invention (in particular regarding the overall acquisition and processing time) opens the door to imaging of many more cells and fields of view (FOVs) per unit time. This has been demonstrated by using an automated acquisition protocol to image cells with immunolabeled microtubules in more than a thousand (33×33=1,089), partly overlapping, FOVs. Using only about 10s of imaging (e.g. k=1,000 images) per FOV, 1,089 sparse STORM images of 55.3 µm×55.3 µm each have been obtained, in a total of only about three hours. These sparse SMLM images provided little small scale information. However, embodiments of the invention, in particular when using cGAN loss for the training phase, led to high quality synthetic dense SMLM images, making it possible to view the microtubule network with clarity and to distinguish microtubule filaments in dense areas that appeared as unstructured regions in the sparse STORM image. Stitching these images together yielded a single synthetic dense SMLM image showing many hundreds of cells. This image contained approximately 7 billion 20×20 nm pixels and covered an area of 1.8 mm×1.8 mm, thereby spanning almost five orders of magnitude in spatial lengths. Therefore, embodiments of the invention make it possible to obtain multiscale images of large fields of view, containing many hundreds of cells, within a time span that for standard localization microscopy is typically consumed to image a much smaller number of cells.

It is to be noted that embodiments of the invention strongly reduce the need for drift correction because the acquisition time of raw images is reduced, leading to the reduction of the effect of spatial drift.

Indeed, a common problem in SMLM microscopy is drift of the specimen during image sequence acquisition which can degrade spatial resolution if not property corrected for or prevented. Computational correction of drift after acquisition requires sophisticated algorithms and/or fiducial markers such as fluorescent beads. Real-time correction of drift requires additional optical and electronic devices.

FIG. 16, comprising FIGS. 16a to 16d, illustrates the use of embodiments of the invention to high throughput imaging of a 1.8 mm×1.8 mm area containing many hundreds of cells.

More precisely, FIG. 16a is a sparse STORM image of the 1.8 mm×1.8 mm area, obtained by assembling a mosaic from 33×33=1,089 sparse STORM images of individual fields of view, obtained from 1,000 raw images each (with Δt=10 862 ms exposure time per image). The time needed for acquiring all these images is about 3 hours. The sparsity of the image is not apparent at this large scale.

A magnified view of the green boxed region in FIG. 16a is illustrated in FIG. 16c. The inset shows a magnified view of the boxed region, highlighting the sparsity of the image.

FIG. 16b is a synthetic dense STORM image (ANNA-STORM(cGAN)) of the same area of the one represented in FIG. 16a, obtained according to embodiment of the invention. It is obtained by assembling a mosaic of 1,089 individual reconstructed synthetic dense STORM images (one per field of view).

A magnified view of the boxed region in FIG. 16b is illustrated in FIG. 16d. Again, the inset shows a magnified view of the boxed region, highlighting the sparsity of the image. A line profile across a microtubule is shown, with a FWHM<50 nm (FWHM: full width at half maximum).

Embodiments of the invention are robust to experimental perturbations. Indeed, the ability to reconstruct highly detailed synthetic dense SMLM images from sparse localization data relies on its prior training on similar images. This raises the question of whether an artificial neural network trained in one experimental condition can be successfully applied to another condition. In order to test this, artificial neural network 300 has been trained on microtubules (as described by reference to FIGS. 10 to 14) to analyze images of cells subjected to drugs affecting the cytoskeletal network. U373 cells were first treated with 1 µM of Taxol, an antimitotic agent that inhibits the depolymerization of microtubules and is known to increase their bending rigidity. The results obtained by embodiments according to the invention clearly display a complex microtubule network and are validated by comparison with the dense STORM image reconstructed from K=30,000 images (representing 5 to 15 min sequence). The arrangement of microtubules visible in these reconstructions is characterized by a larger density of straighter and more parallel microtubules with less frequent apparent crossings than in the untreated control cells, consistent with the expected effect of inhibited microtubule depolymerization and increased rigidity.

Next, cells were treated with 1 µM of Nocodazole, a drug that promotes microtubule depolymerization and is expected to more dramatically alter the cytoskeletal network. Again, whereas the sparse STORM image contained little exploitable information, the results obtained according to embodiments of the invention offered clear and detailed views of the disrupted microtubule network, exhibiting a much smaller number of filaments, with higher curvature, than in untreated cells. These reconstructions were in good agreement with dense STORM images obtained from K=30,000 images (representing a 5 min sequence). Therefore, based on training on microtubules in one experimental condition, embodiments of the invention may be successfully applied to cells in new experimental conditions without any retraining, thus highlighting the method's robustness.

FIG. 17, comprising FIGS. 17a to 17l, illustrates the robustness of embodiments of the invention to experimental perturbations.

More precisely, FIG. 17 are STORM and ANNA-STORM images of microtubules in untreated cells (FIGS. 17a to 17d) and cells treated with 1 µM of Taxol (FIGS. 17e to 17h) or 1 µM of Nocodazole (FIGS. 17i to 17l).

FIGS. 17a, 17e, and 17i are sparse STORM images obtained from the first k=400 (FIG. 17a), k=500 (FIG. 17e) or k=200 raw images (FIG. 17i). The full 55 µm×55 µm field of view is shown.

FIGS. 17b, 17f and 17j are ANNA-STORM images obtained with the L2 loss.

FIGS. 17c, 17g and 17k are ANNA-STORM images obtained with the cGAN loss.

FIGS. 17d, 17h, 17l are dense STORM images obtained from K=60,000 (FIG. 17d) or K=30,000 raw images (FIGS. 17h and 17l).

Number of localizations in the sparse and dense STORM images are as follows: FIG. 17a n=283,103, FIG. 17d: N=6 million, FIG. 17e n=422,248, FIG. 17h N=5.7 million, FIG. 17i n=72,316, FIG. 17l: N=2.6 million.

Embodiments of the invention are adapted to different biological structures. Indeed, the deep learning strategy according to the invention is not restricted to microtubules or other filaments, but can in principle adapt to any type of image if trained accordingly. To show this flexibility, nuclear pores, a very different biological structure, and another popular target of super-resolution imaging studies have been considered. It has been observed that embodiments of the invention make it possible to dramatically improve image quality, making it possible to identify almost all individual pores unambiguously, and almost every individual nucleoporin within them at their correct location (albeit with some errors).

Embodiments of the invention have been tested on experimental images of the nucleoporin gp210 in immunolabeled nuclear membranes of *Xenopus* frog eggs. For the training phase, two dense STORM images were used, with K=30,000 images each and containing about 20 million fluorophore localizations. Embodiments of the invention were then applied to a sparse STORM image of gp210 obtained from the first k=6,000 images. The sparsity of this image makes it difficult to clearly distinguish individual nuclear pores. Embodiments of the invention provides a much clearer image, containing many ring-like structures, as expected for nuclear pores.

FIG. 18, comprising FIGS. 18a to 18f, illustrates the use of embodiments of the invention to different biological structures.

More precisely, FIG. 18 shows the application of embodiments of the invention to simulated (FIGS. 18a to 18c) and real (FIGS. 18d to 18f) nuclear pores.

FIG. 18a is a simulated sparse STORM image with n=544,404 localizations. Individual nuclear pores are hard to identify.

FIG. 18b is an ANNA-STORM image obtained with the L2 loss. Individual nuclear pores, containing 8 nucleoporins, are clearly visible, with few exceptions.

FIG. 18c is the ground truth simulated STORM image (corresponding to an infinite number of localizations, N=∞).

FIG. 18d is a sparse STORM image of the *Xenopus* nucleoporin gp210 immunolabeled with Alexa 647, as obtained from the first k=6,000 raw images (n=25,920 for the 8 µm×8 µm region of interest shown, n=3,665,498 for the entire 54 µm×54 µm field of view).

FIG. 18e is an ANNA-STORM(L2) images of the image in FIG. 18d using the L2 loss.

FIG. 18f is a STORM image obtained from all K=30,000 raw images (N=115,669 for the region shown, N=15,345, 116 for the whole FOV)

Together with the results on microtubules above, this illustrates the versatility of embodiments of the invention and their applicability to images of very different structural content.

FIG. 20 schematically illustrates a third example of the architecture of a system for training an artificial neural network to be used for reconstructing synthetic dense SMLM images from raw images acquired by single molecule localization microscopy.

As illustrated, this system is based on three networks: a generator network 2000, a low-resolution estimator network 2015, and cGAN discriminator network 2020.

For the training stage, a few super resolution images representative of the molecular structure of interest (e.g. tubulin, actin, or a nucleoporin) may be obtained using standard SMLM imaging, i.e. by acquisition of long image sequences (e.g. about 10,000 to 100,000 frames and about 100,000 to 10,000,000 localizations) followed by processing using standard localization software, resulting in highly sampled (dense) SMLM images. In addition, according to the embodiment illustrated in FIG. 20, a low-resolution wide-field image can be obtained (e.g. a diffraction-limited image obtained via a fluorescence microscope), as is typically done while bleaching pre-activated fluorophores before single molecule imaging. As the raw images, low-resolution wide-field images are diffraction-limited images but a higher number of fluorophores, up to all fluorophores, are active in the low-resolution wide-field images. Next, these dense SMLM images are strongly under-sampled, simply by using a much smaller number of input frames (1 . . . k, k<<K), thus yielding sparse SMLM images from the same data. Then, an ANN is trained to recover approximations of the dense SMLM images from these sparse SMLM images and the low-resolution wide-field image. Once trained, the ANN is ready for inference as described by reference to FIG. 21, i.e. it can be used to process new sparse SMLM images, obtained from image sequences with small numbers of frames (k<<K) and hence in much shorter time, and new low-resolution wide-field images in order to reconstruct high quality super-resolution images (synthetic dense SMLM image) not previously seen.

More precisely, as illustrated in FIG. 20, sparse SMLM images SMLM(k), dense SMLM images SMLM(K) as determined for example according to the method described by reference to FIG. 2, 6, or 7, and low-resolution wide-field images L are used to train artificial neural network 2000.

Sparse SMLM images SMLM(k) and low-resolution wide-field images L are used as inputs of artificial neural network 2000, i.e. the generator network, that outputs synthetic dense SMLM images denoted ANNA-SMLM, while dense SMLM images SMLM(K), corresponding to the desired outputs, are compared with the outputs of artificial neural network 2000, to adapt the parameters (typically weights and biases) of the latter accordingly, for example using a stochastic gradient descent algorithm to minimize iteratively a loss error that measures how well real outputs match desired outputs.

These sparse SMLM images SMLM(k), low-resolution wide-field images L, and dense SMLM images SMLM(K) are used as a training set of which each triplet is preferably used at least once during the training phase.

An example of the architecture of artificial neural network 2000 is described by reference to FIG. 22.

As illustrated with reference 2005, several error functions are used during the learning phase to modify the values of the weight in an optimal way. For the sake of illustration, the following error functions are used:
- a low-resolution reconstruction error representing the reconstruction error at low resolution;
- a super-resolution reconstruction error representing the reconstruction error at high resolution; and
- a conditional GAN error.

Accordingly, after SMLM($k_i$) ($Sk_i$ in short) and L, have been input into artificial neural network 2000, the result, denoted ANNA-SMLM($k_i$) ($Ak_i$ in short), is compared with the corresponding desired result SMLM($K_i$) (SK in short) to compute a super-resolution error that is used to correct the parameters of artificial neural network 2000, as illustrated with reference 2010 and described in details hereafter. For the sake of illustration, this comparison may be based on the L1 norm and/or on the method known as multiscale structural similarity index (MS-SSIM). Moreover, after $Ak_i$ has been obtained, its resolution is reduced so that it may be compared with the corresponding low-resolution wide-field image $L_i$, for example according to the MS-SSIM method, to compute a low-resolution error that is also used to correct the parameters of artificial neural network 2000, as illustrated with reference 2015 and described in details hereafter. In particular embodiments, after $Ak_i$ has been obtained, $Ak_i$ and $SK_i$, resolutions are reduced so that they may be compared with the corresponding low-resolution wide-field image L. Images $SK_i$, $Sk_i$, $AK_i$, and $L_i$ are then used as an input of discriminator network 2020 that outputs the probability that the image $SK_i$ or $Ak_i$ is real or synthetic, like discriminator network 805 described in reference to FIG. 8, as illustrated with reference 2020 and described in details hereafter.

Generator network 2000, low-resolution estimator network 2015, and cGAN discriminator network 2020 are trained simultaneously, the cGAN discriminator trying to tell apart real from synthetic data and the generator trying to fool the discriminator.

An example of the architecture of the low-resolution estimator network 2015 and of the discriminator network 2020 is described by reference to FIGS. 23 and 24, respectively.

As described by reference to FIG. 22, artificial neural network 2000 may be of the Pix2Pix type which itself builds on two recent successful deep learning approaches: U-nets and conditional generative adversarial networks (cGAN).

As described above, U-nets are special types of convolutional neural networks consisting as a whole of a 'down-sampling' (encoder) network connected to an 'up-sampling' (decoder) network, which contains layer-skipping connections between encoder and decoder feature maps of equal size. Layer-skipping connections enable accurate, pixel-wise mappings for tasks that require preservation of local information, such as image restoration, for example segmentation or inpainting.

Conditional generative adversarial networks comprise two competing artificial neural networks: a generator network (for example a network of the U-nets type) that outputs synthetic images and a discriminator network that takes a real or synthetic image as input (without knowledge of its origin) and outputs the probability that the image is real or synthetic. The two networks are trained simultaneously, with the discriminator trying to tell apart real from synthetic data and the generator trying to fool the discriminator.

Artificial neural networks of the Pix2Pix type are described, for example, in the article entitled "*Image-to-Image Translation with Conditional Adversarial Networks*" Isola, P., Zhu, J.-Y., Zhou, T. & Efros, A. A., 2016 (http://arxiv.orgfabs/1611.07004).

FIG. 21 illustrates schematically a second example of the architecture of a system for reconstructing synthetic dense SMLM images, from raw images acquired by single molecule localization microscopy and from low-resolution wide-field images, using an artificial neural network trained according to embodiments of the invention.

As illustrated, a sparse SMLM image SMLM'(k) is obtained from a set of k raw images, denoted raw image' 1 to raw image' k, acquired by single molecule localization microscopy during time $t_1$ to $t_k$. It is used as a first input to artificial neural network 2000 that outputs a corresponding synthetic dense SMLM image denoted ANNA-SMLM'(k). A low-resolution wide-field image, denoted L(k), representative of the time period $t_1$ to $t_k$ is also obtained and used as a second input to artificial neural network 2000 (that has been previously trained as described by reference to FIG. 20).

As described above, sparse SMLM image SMLM'(k) is preferably obtained from the set of raw images according to the same image processing method as the one used for obtaining sparse SMLM images to create the training data set, for example the STORM image processing.

According to particular embodiments, the obtained synthetic dense SMLM image ANNA-SMLM'(k) is down-converted in low-resolution estimator network 2015 so as to be compared with the low-resolution wide-field image used to generate the obtained synthetic dense SMLM image ANNA-SMLM'(k), in error map generator 2100, in order to generate an error map representing the locations where errors are more likely to occur.

FIG. 22 illustrates an example of the architecture of the generator network 2000 illustrated in FIG. 20, wherein each line corresponds to a distinct layer of the neural networks. The lines show the connections between the layers. The input of the network is a sparse PALM image S (S_SMLM), a low-resolution wide-field image W (LR_L), and a switch value M (SWITCH). The output $g$ (S, W, M) is a reconstructed ANNA PALM image (A_SMLM) of the same size.

The switch value makes it possible for the network to switch between different types of images, such as molecular structures (e.g. nucleoporins or microtubules).

Like artificial neural network 300 described in reference to FIG. 5, artificial neural network 2000 comprises an encoder network (upper part) and a decoder network (lower part) with skip connections. It is a U-net with 16 convolutional layers and tens of millions of parameters. Its inputs and outputs comprise SMLM image patches containing (256m)×(256m) pixels, where m is an integer. In particular, the input comprises a sparse SMLM image (denoted S_SMLM), for example a sparse STORM image. The input further comprises a low-resolution wide-field image (denoted LR_L) that is resized to be of the same size as the size of the input sparse SMLM image. The output is a synthetic dense SMLM image (denoted A_SMLM) of the same size as the input sparse SMLM image.

The encoder network contains multiple convolutional layers (denoted Conv and having the same types of parameters as the ones described in reference to FIG. 5), alternating with down-sampling (max-pooling, e.g. 2×2 max-pooling with a stride of 2) layers, stacked on top of each other, resulting in feature maps of halving size and doubling number. The encoder takes as input two images, namely the sparse super-resolution image (S_SMLM) and the low-resolution wide-field image (LR_L), plus the switch (SWITCH). According to the given example, the low-resolution wide-field image LR_L is up-sampled using bilinear interpolation and then concatenated (Cat, e.g. concatenating two groups of input feature maps along each channel or feature dimension) with the sparse super-resolution image S_SMLM as different input channels. The switch value is represented using 1-hot encoding (denoted 1-HOT, encoding an integer number using one-hot representation) and then coupled to the encoder via convolution layers with a kernel size of 1×1 (denoted Conv1, e.g. a special case of 2D convolution with a 1×1 convolution kernel and a stride of 1). For each convolution layer, this result is added to the one of the corresponding convolution (denoted +, e.g. along each channel or feature dimension).

The decoder network contains multiple up-sampling convolutional layers (denoted UpConv), resulting in feature maps of doubling size and halving number (according to embodiments, the types of parameters of the up-sampling convolution layers are similar to the ones of the convolution layers of the encoder). The last layer of the decoder network produces an output image of identical size as the input image fed to the encoder network.

As in the Pix2Pix network, convolution layers with a stride of two are used (instead of max pooling layers) and rectified linear unit layers (denoted ReLU, e.g. x→ max(x, 0)) in the encoder are replaced by "leaky ReLUs" (denoted LReLU, e.g. x→ max(x, 0)+min(εx, 0), with ε=0.2). As in the U-net, the generator contains direct (skip-layer) connections between feature maps located symmetrically in the encoder and decoder. These feature maps, which have identical size, are concatenated in the corresponding layers (Cat) of the decoder. The skip-layer connections make it possible for the network to combine local, pixel-wise information, with the larger context information that is propagated through consecutive convolutional layers.

FIG. 23 illustrates an example of the architecture of the low-resolution estimator network 2015 illustrated in FIG. 20.

As illustrated and according to the given example, the architecture of low-resolution estimator network 2015 is based on four convolutional layers and two max-pooling layers. Dropout layers and leaky ReLUs are used after each convolutional layer except for the last layer, where a sigmoid activation function is used (e.g. x→ $(1+\exp(-x))^{-1}$). Low-resolution estimator network 2015 takes as input (denoted INPUT_LD) either an experimentally acquired dense SMLM image T or the generator output $\mathcal{G}$(S,W,M) and provides as output (denoted OUTPUT_LD) a low-resolution image which is smaller than the input, 4 times smaller in the given example. It is to be noted that convolutional layers and max-pooling layers can be added or removed to account for different size ratios between the input and output images.

For the sake of illustration, the low-resolution estimator network takes the (256m)×(256m) dense SMLM image patch or the ANNA-SMLM reconstruction patch as input and outputs a reconstructed low-resolution image with (64m)×(64m) pixels.

FIG. 24 illustrates an example of the architecture of the cGAN discriminator network 2020 illustrated in FIG. 20.

According to particular embodiments, this architecture is similar to the discriminator network of the Pix2Pix network, except for the last layer, where the sigmoid function has been removed since the logarithmic losses in the objective function has been replaced by least squares losses. cGAN discriminator network 2020 takes as input a low-resolution wide-field image (W), a sparse SMLM image (S), and either a reconstruction $\mathcal{G}$(S,W,M) output by the generator network or a corresponding dense SMLM image (T), the three images (S, $\mathcal{G}$(S,W,M) or T, W) being, for example, concatenated as a 3-channel image (denoted INPUT_GD). The output of the discriminator is a small image (denoted OUTPUT_GD) whose pixels values indicate whether the cGAN discriminator network believes that the corresponding patch in the sparse SMLM image is an experimentally acquired real dense PALM image T (e.g. high values) or a reconstruction $\mathcal{G}$(S,W,M) (e.g. low values).

According to the illustrated example, the cGAN discriminator network has five convolutional layers. Its inputs are two (256m)×(256m) pixel image patches (the sparse SMLM image and either its ANNA-SMLM reconstruction or the corresponding dense SMLM image), plus the up-scaled low-resolution wide-field image, and its output is a (30m)×(30m) image whose pixel values indicate whether the corresponding input patch is real or generated. AN convolutional layers are followed by batch normalization.

Training Objectives and Error Map

Each of the generator network, low-resolution estimator network, and cGAN discrimination network is associated with a distinct objective function (also called loss). The generator's objective function, $\mathcal{L}_G$, itself consists of three distinct terms, which are specified below, along with the objective functions $\mathcal{L}_Q$ and $\mathcal{L}_D$ for the low-resolution estimator network (denoted Q) and the cGAN discriminator network (denoted D), respectively. In the following equations, the sparse input image is designated as S, the low-resolution wide-field input image as W, the corresponding dense SMLM image (i.e. the target) as T, and the generator output as A=G (S, W), where G designates the generator network.

In FIG. 20, images W, S, T, and A are labelled L, SMLM(k) (or Sk), SMLM(K) (or SK), and (ANNA-SMLM (k) (or Ak), respectively. Low-resolution images reconstructed by low-resolution estimator network 2015 (Q) from images A and T are designated as WA=Q(A) and WT=Q(T), respectively.

The first term of $\mathcal{L}_G$ is the super-resolution reconstruction error, hereafter referred to as $\mathcal{L}_{SuperRes}(\mathcal{G})$. This term penalizes the difference between the generator output A and the target image T. This difference may use a weighted average of the multi-scale structural similarity index (MS-SSIM) between images A and T and a modification of the L1 norm, where the absolute difference between images A and T is smoothed by a Gaussian kernel, and may be defined as follows:

$$\mathcal{L}_{SuperRes}(\mathcal{G}) = \mathbb{E}_{(S,T,W,M) \sim p_{data}(S,T,WM)}[\rho(1-MS\_S-SIM(A,T))+(1-\rho)\langle G_\sigma * |A-T| \rangle]$$

$$\mathcal{L}_{SuperRes}(\mathcal{G}) = \mathbb{E}_{(S,T,W,M) \sim p_{data}(S,T,WM)}[\rho(1-MS\_S-SIM(\mathcal{G}(S,W,M),T))+(1-\rho)\langle G_\sigma * |\mathcal{G}(S,W,M)-T| \rangle]$$

where $\mathbb{E}$ denotes expectation;

$p_{data}$(S, T, W M) is the joint probability density of the sparse SMLM images, dense SMLM images, wide-field images, and switch settings from the training data set;

MS_SSIM(A, T) is the multi-scale structural similarity index between images A and T;

$G_\sigma$ is a Gaussian smoothing kernel;

* denotes the convolution;

|A−T| is the absolute difference image (i.e. pixel (i,j) has value |A(i,j)−T(i,j)| and ρ is a scalar weight between 0 and 1 that balances the relative contributions of MS_SSIM and the modified L1 norm, that may be se, for example, to 0.84 (ρ=0.84). The second term of $\mathcal{L}_G$ is called $\mathcal{L}_{LowRes}(\mathcal{G}, Q)$. It is used to measure the consistency between the low-resolution images WA and WT reconstructed by the low-resolution estimator network 2015. It may be expressed as follows:

$$\mathcal{L}_{LowRes}(\mathcal{G}, Q) = \mathbb{E}_{(S,T,W,M) \sim p_{data}(S,T,WM)}[1 - MS\_SSIM(WA, WT)]$$

$$\mathcal{L}_{LowRes}(\mathcal{G}, Q) = \mathbb{E}_{(S,T,W,M) \sim p_{data}(S,T,WM)}[1 - MS\_SSIM\ Q(\mathcal{G}(S,W,M)) - Q(T))]$$

Alternatively, image WT can be replaced, in the above objective function, by the actually observed low-resolution wide-field image W. The low-resolution estimator network 2015 (Q) is trained simultaneously with the generator network 2000 ($\mathcal{G}$) to produce a low-resolution image from the dense SMLM image T that is consistent with the observed low-resolution wide-field image W. This training may be done based on the following objective function:

$$\mathcal{L}_Q(Q) = \mathbb{E}_{(T,W) \sim p_{data}(T,W)}[1 - MS\_SSIM(Q(T), W)]$$

It is to be noted that according to embodiments, the reconstructed low-resolution image Q(T) is four times smaller than the dense SMLM image T. Because the input low-resolution wide-field image W has a different size, a bilinear interpolation may be used to resize image W to the same size as image Q(T). Naturally, a scaling factor different from four can be achieved by adding or removing down-sample layers in the low-resolution estimator network if needed.

Regarding inference, low-resolution estimator network 2015 is used to produce an error map as described by reference to FIG. 21. This error map is defined as follows:

$$E_Q(A, W) = (1 - MS\_SSIM(Q(A), W))(Q(A) + W)$$

High or low values of the error map indicate large or small inconsistencies, respectively, between the reconstructed super-resolution image A and the observed low-resolution wide-field image W.

The third term of $\mathcal{L}_G$ denoted $\mathcal{L}_{cGAN}(\mathcal{G}, D)$ draws from recent work on generative adversarial networks (e.g. Isola, P., Zhu, J.-Y., Zhou, T. & Efros, A. A. "*Image-to-Image Translation with Conditional Adversarial Networks*" (http://arxiv.org/abs/1611.07004), 2016, Goodfellow, I. et al. "*Generative Adversarial Nets*", 2672-2680, 2014, and Mao, X. et al. "*Least Squares Generative Adversarial Networks*", 2016).

In GANs, a generator network $\mathcal{G}$ learns to transform random input vectors z (drawn from a probability density $p_z(Z)$) into new samples of a data probability density $p_{data}(x)$, the data samples x being the dense SMLM images T. The generator network $\mathcal{G}$ learns by working against a discriminator network $\mathcal{D}$ (e.g. cGAN discriminator network 2020) that simultaneously learns to discriminate between original data samples and samples generated by generator network $\mathcal{G}$. As a whole, adversarial training thus consists in playing a minmax game such that $$(\mathcal{G}^*, \mathcal{D}^*) = \arg\min_\mathcal{G} \max_\mathcal{D} \mathcal{L}_{GAN}(\mathcal{G}, \mathcal{D})$$

with an objective function of the following form:

$$\mathcal{L}_{GAN}(\mathcal{G}, \mathcal{D}) = \mathbb{E}_{x \sim p_{data}(x)}[\log \mathcal{D}(x)] + \mathbb{E}_{z \sim p_z(z)} \log[1 - \mathcal{D}(\mathcal{G}(z))]$$

or equivalently by simultaneous optimization of two coupled loss functions:

$$\begin{cases} \mathcal{D}^* = \arg\max_\mathcal{D}(\mathbb{E}_{x \sim p_{data}(x)}\log[\mathcal{D}(x)] + \mathbb{E}_{z \sim p_z(z)}\log[1 - \mathcal{D}(\mathcal{G}(z))]) \\ \mathcal{G}^* = \arg\min_\mathcal{G}(\mathbb{E}_{z \sim p_z(z)}\log[1 - \mathcal{D}(\mathcal{G}(z))]) \end{cases}$$

In a conditional GAN (cGAN), the generator network and the discriminator network have an extra input vector c and the first objective function above may be written as follows:

$$\mathcal{L}\mathcal{D}(\mathcal{G}, \mathcal{D}) = \mathbb{E}_{(c,x) \sim p_{data}(c,x)}[\log \mathcal{D}(c,x)] + \mathbb{E}_{c \sim p_{data}(c), z \sim p_z(z)}\log[1 - \mathcal{D}(c, \mathcal{G}(c,z))]$$

such that the generator network learns a conditional probability density $p_{data}(x|c)$ and the second objective function likewise becomes the following one:

$$\mathcal{L}_{cGAN}(\mathcal{G}, \mathcal{D}) = \mathbb{E}_{c \sim p_{data}(c), z \sim p_{data}(z)}\log[1 - \mathcal{D}(\mathcal{G}(z))]$$

According to embodiments, the logarithmic losses described above are replaced by least square losses, as they empirically yielded better results. Thus, the objective functions read as follows:

$$\mathcal{L}\mathcal{D}(\mathcal{G}, \mathcal{D}) = \mathbb{E}_{(c,x) \sim p_{data}(c,x)}(\mathcal{D}(c,x) - 1)^2 + \mathbb{E}_{c \sim p_{data}(c), z \sim p_z(z)}[\mathcal{D}(c, \mathcal{G}(c,z))]^2$$

$$\mathcal{L}_{cGAN}(\mathcal{G}, \mathcal{D}) = \mathbb{E}_{c \sim p_{data}(c), z \sim p_z(z)}[1 - \mathcal{D}(c, \mathcal{G}(c, z))]^2$$

According to the embodiments described by reference to FIGS. 20 to 24, the input c is the sparse SMLM image S combined with the low-resolution wide-field image W. It is to be noted that in practice the noise z is introduced only through the use of dropout layers, as in the Pix2Pix implementation. Thus, the objective functions are:

$$\mathcal{L}_\mathcal{D}(\mathcal{D}) = \mathbb{E}_{S,T,W,M \sim p_{data}(S,T,W,M)}(\mathcal{D}(W,S,T) - 1)^{2+}$$
$$\mathbb{E}_{z \sim p_z(z), s \sim p_{data}(s)}(\mathcal{D}((W,S, \mathcal{G}(S,W,M)))^2$$

and $$\mathcal{L}_{cGAN}(\mathcal{G}, \mathcal{D}) = \mathbb{E}_{(S,T,W,M) \sim p_{data}(S,T,W,M)}(\mathcal{D}(W,S, \mathcal{G}(S,W,M)) - 1)^2$$

As a consequence, combining the three loss terms described above leads to the following optimization problem:

$$\begin{cases} Q^* = \arg\min_Q \mathcal{L}_Q(Q) \\ \mathcal{D}^* = \arg\max_\mathcal{D} \mathcal{L}_\mathcal{D}(D) \\ \mathcal{G}^* = \arg\min_\mathcal{G}[\alpha \mathcal{L}_{SuperRes}(\mathcal{G}) + \beta \mathcal{L}_{LowRes}(\mathcal{G}, Q) + \gamma \mathcal{L}_{cGAN}(\mathcal{G}, \mathcal{D})] \end{cases}$$

The weights α, β, and γ are hyper-parameters. For the sake of example, they can be set manually to α=50, β=25, and γ=1.

Still for the sake of illustration, the whole system illustrated in FIG. 20 may be trained end-to-end using stochastic gradient descent (SGD) with the method described in Kingma, D. P. & Ba, J. Adam, "*A Method for Stochastic Optimization*" (2014) and a batch size of 1 with 200,000 or more iterations (backpropagation steps). The implementation was adapted from affine layer's port to TensorFlow (Abadi, M. et al. "*TensorFlow: Large-Scale Machine Learning on Heterogeneous Distributed Systems*", 2016) of the Torch implementation of Pix2Pix.

Training the system from scratch typically takes from hours to days on a single GPU. Once trained, it takes only about one second to reconstruct a super-resolution image of 2,560×2,560 pixels (corresponding to an entire FOV). Training time could be further reduced by pre-training (or transfer learning), use of GPU clusters, or optimized data augmentation.

Validation on Simulated Images

In order to validate the system described by reference to FIGS. 20 to 24, Brownian dynamics simulations are used to generate 200 dense SMLM images of semi-flexible filaments intended to mimic microtubules, with a resolution $R_{loc}\approx23$ nm (corresponding to a localization precision $\sigma_{loc}\approx10$ nm). These effectively represent "perfect" SMLM images that would be obtained with an infinite number of localizations (n=∞). Varying levels of Poisson noise were applied to these perfect images to create sparse PALM images corresponding to finite numbers of localizations (n<∞). The system is then trained using the perfect images as targets and the sparse images and a corresponding low-resolution wide-field image as inputs, varying the noise level, i.e. the number of localizations, over a large range. Next, the trained system is applied to a distinct set of SMLM images generated by the same stochastic simulation.

FIG. 25a shows a low-resolution wide-field image and FIG. 25b shows a corresponding sparse SMLM image obtained from n=6,834 localizations. Although curvilinear structures can be seen in this image despite its sparsity, small-scale features remain highly ambiguous (FIG. 25b, inset), and the resolution according to a recently proposed five-fold Nyquist criterion is limited by sampling to $R_{5\times Nyq}\approx85$ nm; according to this criterion, n>$R_{5\times Nyq}$=60,000 localizations are needed to achieve a resolution of 23 nm. FIG. 25c shows the ANNA-SMLM image reconstructed from the low-resolution wide-field image alone, which exhibits clear and continuous filaments that were not recognizable in the low-resolution wide-field image. Most of the relatively isolated filaments roughly agree with the perfect SMLM image shown in FIG. 25e. In the denser regions, however, many small features are erroneous, e.g. filaments are incorrectly joined, displaced, split or merged as indicated with blue arrows in FIG. 25c. By contrast, the ANNA-SMLM image reconstructed from the sparse SMLM image and the low-resolution wide-field images combined exhibits continuous and sharp filaments in very good agreement with the perfect SMLM image, as observable from FIGS. 25d, 25e, and 25f).

The spatial resolution of these reconstructed images is no longer limited by diffraction or sampling, but only by the localization precision, and is thus $R_{loc}\approx23$ nm, as in the perfect images. These results indicate that high quality super-resolution images can be obtained from only a small fraction (here, approximately 11% of $R_{5\times Nyq}$ above) of the minimum number of localizations traditionally required, hence enabling a strong reduction in acquisition time. Nevertheless, reconstruction errors can still occur in areas where the sparse localization data are most ambiguous, e.g. where the density of filaments is highest, as indicated with white arrows in FIGS. 25d, 25e, and 25f. These errors can be reduced by increasing the number of localizations n, implying a trade-off between acquisition time and reconstruction quality.

To quantify this trade-off, the MS-SSIM between reconstructed ANNA-SMLM and perfect SMLM images (n=∞) may be computed as a function of localization number, for example from n~200 to n~2×10$^6$, in comparison with the standard SMLM images, as shown in FIG. 25g. According to the given example, the MS-SSIM is comprised between 0 and 1 and reaches 1 for perfect reconstructions.

As illustrated (FIG. 25g, black curve), for standard SMLM images, the MS-SSIM increases monotonically from a low value approximately equal to 0.2 to a higher value approximately equal to 0.95, for n=20 million localizations. Using only the sparse image as input, ANNA-SMLM reconstructions achieve MS-SSIM that are consistently higher and increase with localization number n much more rapidly than standard PALM, exceeding 0.9 for n~10,000 localizations or more, as illustrated in FIG. 25g with the dashed blue curve. ANNA-SMLM achieves the same MS-SSIM as standard PALM at the five-fold Nyquist sampling level (about 0.65) with only n~2,000 localizations instead of ~60,000, suggesting a roughly 30-fold speed-up. If the low-resolution wide-field image is used as additional input, the MS-SSIM further increases, and dramatically so for low localization counts, as illustrated in FIG. 25g with the solid blue curve. For example, with n~7,477 localizations, ANNA-SMLM achieves a MS-SSIM (about 0.95) similar to standard PALM with n~644,844 corresponding to a speed-up of roughly two orders of magnitude.

As any image restoration method, ANNA-SMLM can make errors. The low-resolution error map described by reference to FIG. 21 provides a means to estimate where errors are most likely to occur.

Figure 26:
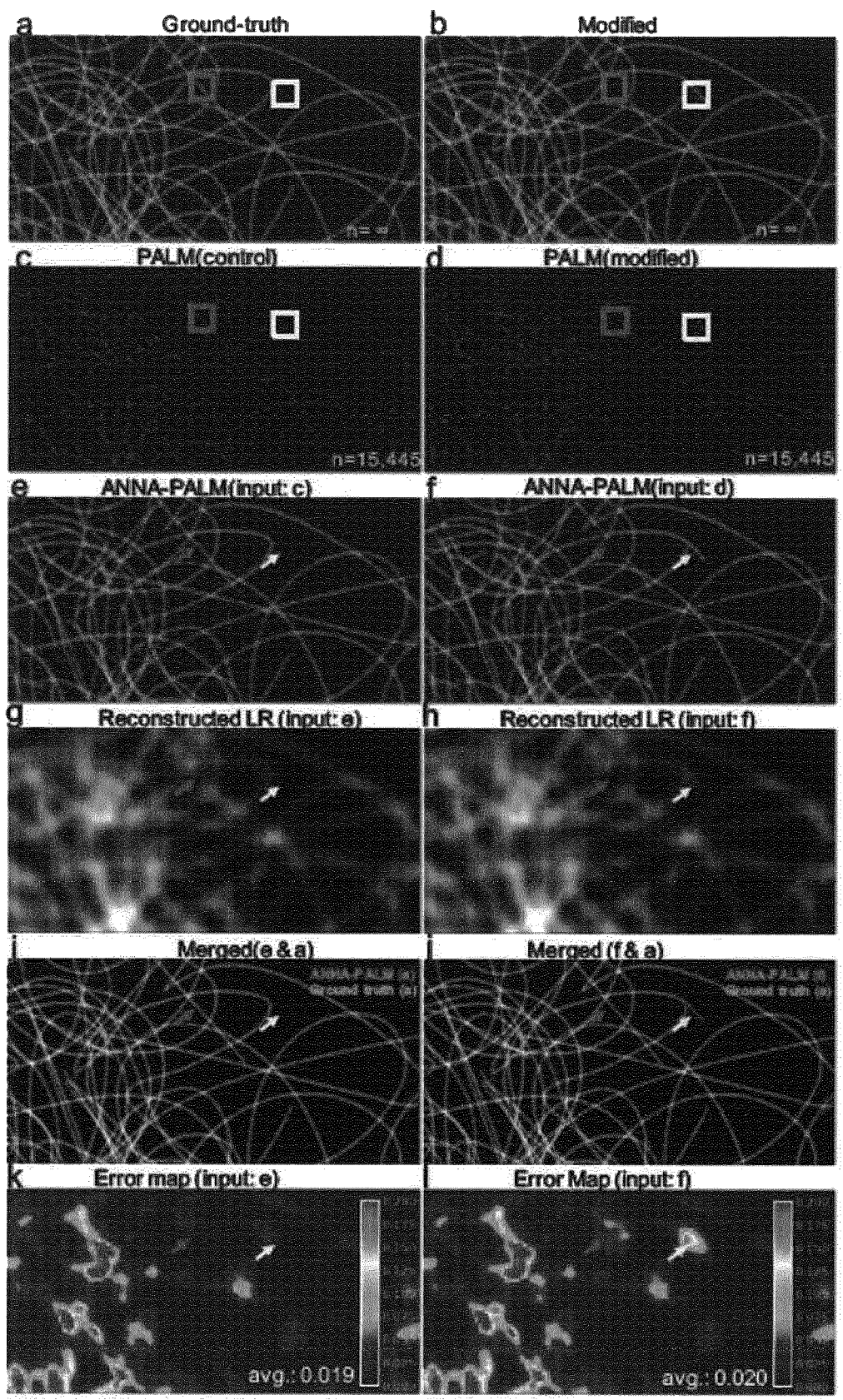
Figure 27:
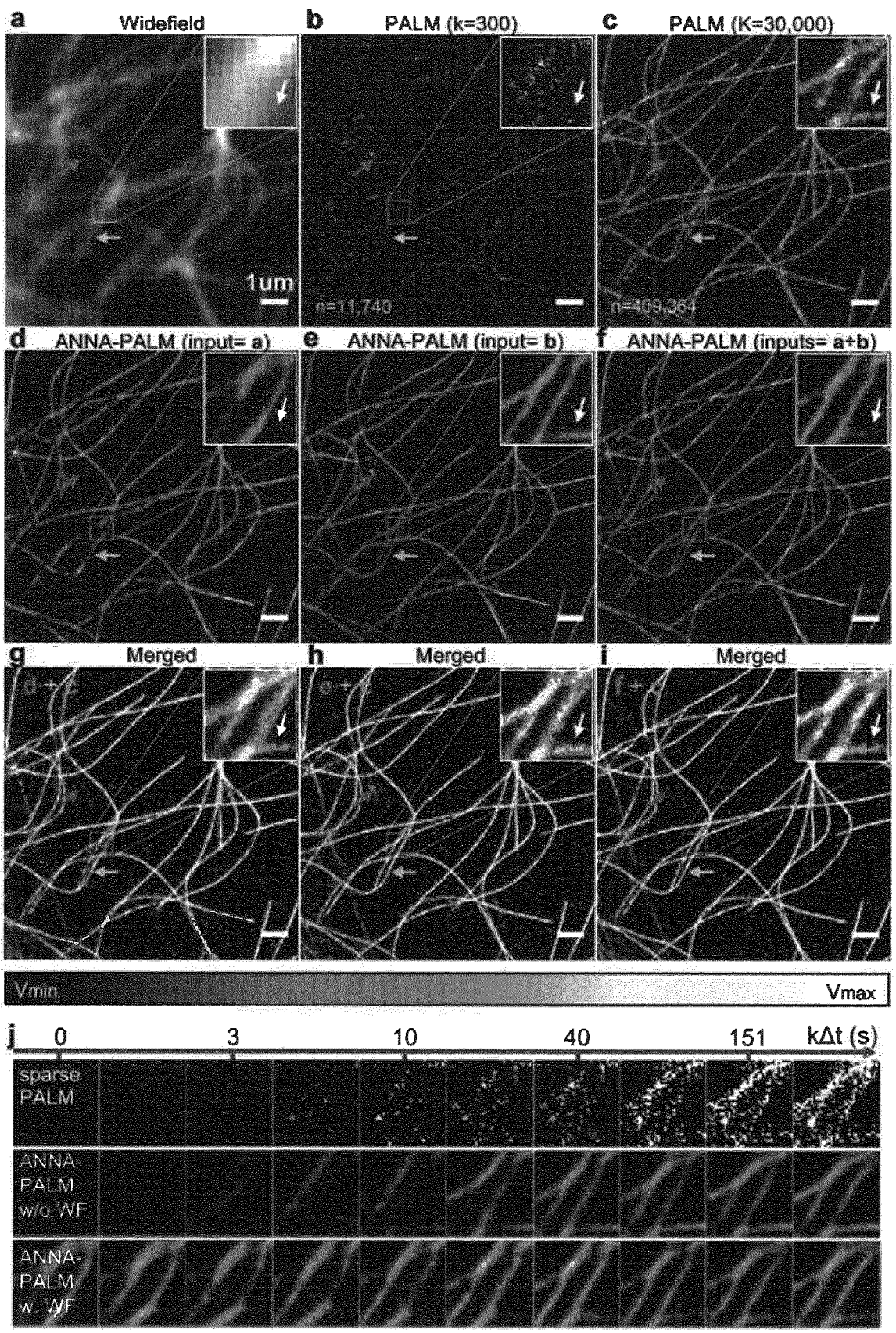

FIG. 26 shows how low-resolution error maps produced by ANNA-SMLM reflect ambiguities in the sparse localization image and/or reconstruction errors. FIGS. 26a and 26b represent simulated "perfect" SMLM images (n=co) displaying regions of high filament density (left) and regions of low filament density (right). Image 26a is identical to FIG. 25e. Image 26b is identical to image 26a except for the artificial displacement of a small piece of filament: the portion of image corresponding to the blue box in image 26a has been reproduced in the white box of FIG. 26b.

Images of FIGS. 26c and 26d represent sparse SMLM images obtained by random subsampling of the perfect SMLM images represented in FIGS. 26a and 26b, respectively.

Images of FIGS. 26e and 26f are ANNA-SMLM reconstructions of the sparse PALM images of FIGS. 26c and 26d, respectively. Considering the image of FIG. 26a as the ground truth, the blue and white arrows point to a region of incorrectly missing filament (false negative) and an incorrectly added filament (false positive), respectively.

Images of FIGS. 26g and 26h are low-resolution images predicted by ANNA-SMLM using the sparse SMLM images of FIGS. 26e and 26f as inputs, respectively.

Images of FIGS. 26i and 26j are merged images showing the ground truth image of FIG. 26a in green and the ANNA-SMLM reconstructions of FIGS. 26e and 26f, respectively, in red.

Images of FIGS. 26k and 26l are error maps generated by ANNA-SMLM from comparisons of the predicted low-resolution images of FIGS. 26g and 26h with the same low-resolution wide-field image simulated based on the unaltered perfect SMLM image of FIG. 26a and shown in FIG. 25a. The high error regions pointed out by the blue and white arrow in image of FIG. 26j reflect the false negative and false positive regions in the ANNA-SMLM reconstruction illustrated in FIG. 26f. The average error value is indicated and is higher for the altered image. The high error areas on the left of images of both FIGS. 26k and 26l reflect the larger ambiguity of the sparse localization images of FIGS. 26c and 26d in the regions of high filament density.

Thus, the error map provides a useful tool to highlight regions in the reconstructed image most likely to contain errors, and conversely, to outline regions where reconstructions are most trustworthy. These simulation results suggest that ANNA-SMLM can achieve considerable reductions in acquisition time for localization microscopy, and that reconstruction reliability can be mapped.

ANNA-SMLM Reconstructions of Immunostained Microtubules

To test the system described by reference to FIGS. 20 to 24 on real images of immunolabeled microtubules, the system has been trained on seven dense SMLM images (with low-resolution wide-field images) obtained during 10 minute long acquisitions (K=60,000; Δt=10 ms). Then, a sparse SMLM image of micro tubules in a distinct FOV has been obtained from only 9s of acquisition (k=300; Δt=30 ms), together with a low-resolution wide-field image (2×50 ms exposure time), as illustrated in FIGS. 27*a* and 27*b*, respectively. While microtubule filaments can already be seen in the sparse SMLM image, structural details below the diffraction limit are hard to discern, making it difficult to follow the path of individual filaments in the denser regions and to identify features such as filament crossings (FIG. 27*b*).

By contrast, the ANNA-SMLM images, whether reconstructed from the low-resolution wide-field image alone, the sparse SMLM image alone, or both, as shown in FIGS. 27*d*, 27*e*, and 27*f*, respectively, all display sharp and continuous filaments and clearly reveal many structural details. Their resolution is similar to or even better than the dense SMLM image illustrated in FIG. 27*c*. As observable, in regions where microtubule filaments are distant from each other, the ANNA-SMLM image reconstructed from the low-resolution wide-field image alone is in good agreement with the dense SMLM image as can be seen from the images of FIGS. 27*d* and 27*g*. However, it is often incorrect in places of high microtubule density as indicated with gray arrows in FIGS. 27*d* and 27*g*. Most of these reconstruction errors are corrected when applying ANNA-SMLM to the sparse SMLM image instead, as can be seen from the images of FIGS. 27*e* and 27*h*. For example, parallel sections of two microtubules unresolved in the low-resolution wide-field image and incorrectly merged in the image of FIG. 27*d* are now dearly separated and positioned at their correct location, and incorrectly missed portions of other filaments are recovered when using the sparse SMLM image, as indicated with white and gray arrows in FIG. 27*h*. Counterintuitively, the sparse SMLM image exhibits high signal in some locations where the dense SMLM image does not, presumably because of spurious localizations due e.g. to unspecific binding (see e.g. blue arrows in FIG. 27*b*). Such signal can lead to incorrect features in the ANNA-SMLM reconstruction from the sparse localization data alone (see e.g. blue arrows in FIGS. 27*e* and 27*h*).

However, when combining the low-resolution wide-field and sparse SMLM data, these artefacts are largely removed, resulting in a reconstruction in very good agreement with the dense SMLM image as can be seen in FIGS. 27*f* and 27*i*. As the number of frames k increases, the quality of reconstructions also increases, as shown in FIG. 27*j*. More quantitatively, a MS-SSIM analysis similar to that for the simulated data above (but where the ground truth is defined as the ANNA-SMLM output of the dense SMLM image) suggests that ANNA-SMLM allows a reduction of acquisition time compared to standard SMLM of up to two orders of magnitude.

As mentioned above, computational reconstructions can contain errors. To help predict where such errors are most likely, a low-resolution wide-field image can be used to compute an error map. This error map highlights regions where the ANNA-SMLM reconstruction indeed disagrees with the dense SMLM image. Conversely, reconstructions are of high quality in the majority of regions where the error map is dim. Thus, ANNA-SMLM can produce high quality approximations of super-resolution images from a tiny fraction of the acquisition time typically required in SMLM imaging, along with an estimate of where reconstruction errors are most likely.

Figure 28:
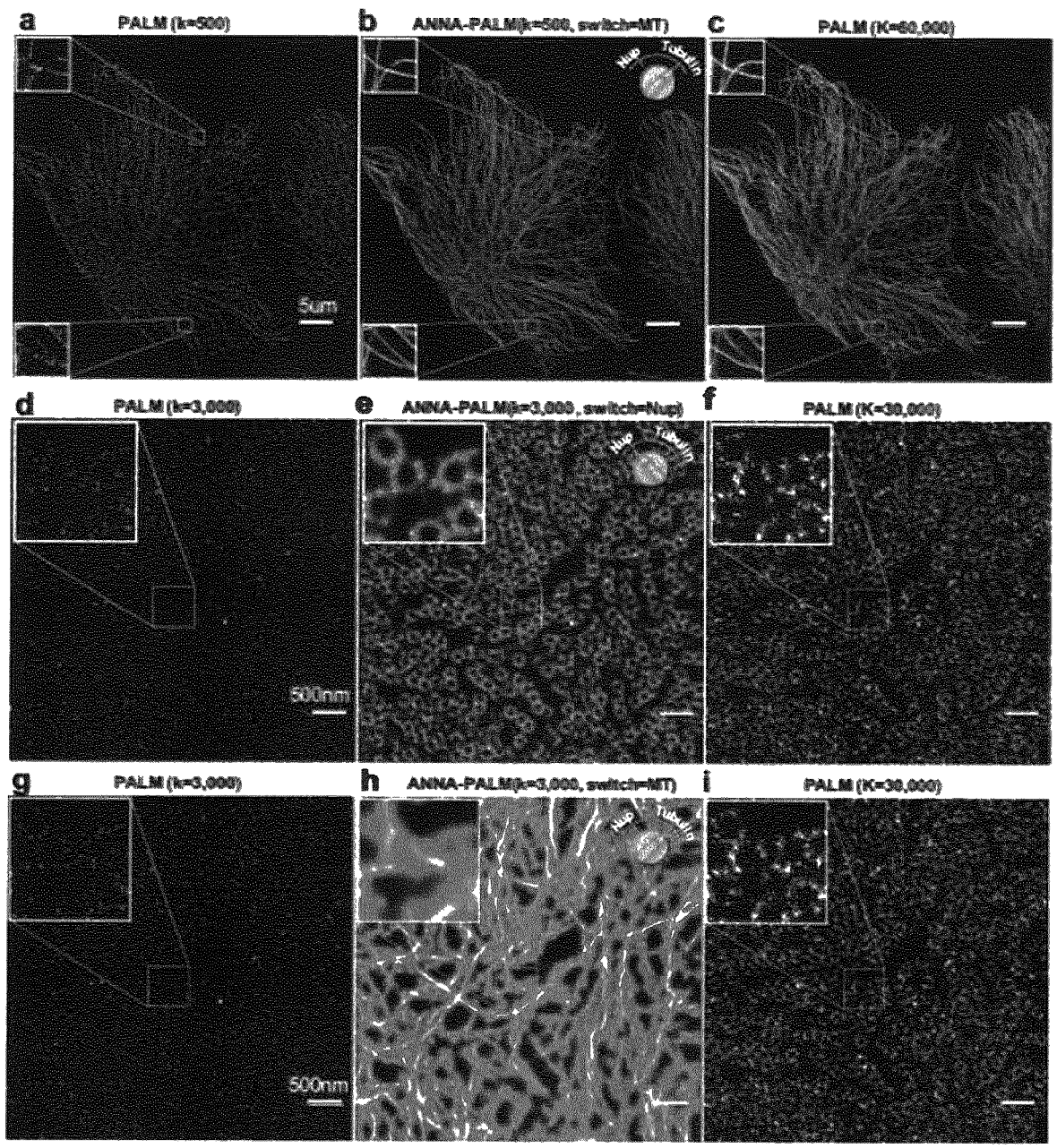

Reconstruction Sparse Microtubule and Nuclear Dora Images with a Single Artificial Neural Network FIG. 28 illustrates the use of an artificial neural network such as one of those described by reference to FIGS. 20 to 24, trained on both microtubule and nuclear pore images, to reconstruct sparse localization images of microtubules (as illustrated in FIGS. 28*a*, 28*b*, and 28*c*) or of nuclear pores (as illustrated in FIGS. 28*d*, 28*e*, and 280*f*).

FIG. 28*a* represents a sparse SMLM image of microtubules obtained from k=500 frames. FIG. 28*b* illustrates an ANNA-SMLM reconstruction based on the image of FIG. 28*a* with a structure switch set to microtubules (denoted "MT"). FIG. 28*c* represents a dense SMLM image obtained from K=60,000 frames.

FIG. 28*d* represents a sparse SMLM image of the nucleoporin gp210 obtained from k=3,000 frames. FIG. 28*e* illustrates an ANNA-SMLM reconstruction based on the image of FIG. 28*d* with the structure switch set to nuclear pores (denoted "NPC"). FIG. 28*f* represents a dense SMLM image obtained from K=30,000 frames.

FIG. 28*g* is identical to FIG. 28*d*.

FIG. 28*h* represents an ANNA-SMLM reconstruction based on the image of FIG. 28*g* with the structure switch set to microtubules ("MT"). The artifactual nature of the reconstructed image is to be noted.

FIG. 28*i* is identical to FIG. 28*f*.

As illustrated, the system requires prior training on dense SMLM images with structures similar to those in the sparse SMLM images to be reconstructed. Optimal reconstruction accuracy is expected when the sparse SMLM images (and/or the low-resolution wide-field images) belong to the same probability distribution as the training images. Nevertheless, the system is robust and does not require retraining for experimentally induced changes in structures and multiple variations in imaging parameters. The structure switch, corresponding to the switch value M (described in reference to FIG. 22), allows a single system to be trained with different sets of images, for example sets of images representative of different structures, by assigning a different switch value to each set of images. Advantageously, the use of the switch reduces the computation time of the artificial neural network during training by limiting the computation to the selected set of training data.

Moreover, embodiments of the invention facilitate dynamic super-resolution imaging in live cells. Indeed, it makes it possible to use fewer consecutive raw images than SMLM or equivalent image processing methods to reconstruct a single super-resolution movie frame, and hence improve upon the temporal resolution without sacrificing spatial resolution. It does not require higher excitation power, and hence does not suffer from additional phototoxicity and photobleaching, thereby allowing prolonged observations in gentler conditions. Thus, it allows faster and longer live cell super-resolution imaging without excessive photodamage.

In particular embodiments, when an artificial neural network such as one of those described by reference to FIGS. 20 to 24 is trained with triplets of sparse localization images, at least partially corresponding low-resolution wide-field images, and corresponding dense super-resolution images, it is possible to use only a low-resolution wide-field image as an input to reconstruct a synthetic dense super-resolution image (e.g. see FIG. 27d). Since the low-resolution wide-field image can be obtained in only one frame with an acquisition time of typically 50-500 ms, the speed of acquisition is fast enough to combine live-cell imaging and super-resolution imaging. Using a low-resolution wide-field image as an input also simplifies the staining and the sample preparation. For example, there is no need to use a blinking buffer as in STORM, and fluorescent proteins, such as the widely used Green-Fluorescent Protein (GFP), can be used thereby reducing the perturbation of live samples. Using a low-resolution wide-field image as an input also makes it possible to perform high-throughput live-cell super-resolution imaging.

Moreover, embodiments of the invention can be extended to reconstructing 3D synthetic dense SMLM images in a relatively straightforward way. The requirements are a training data set consisting of dense 3D SMLM data and one or more sparse 3D SMLM data to be reconstructed after training of the ANN. The ANN architecture will need to be modified to accommodate 3D input and output data. The 3D SMLM data can be obtained using a variety of techniques, including point spread function (PSF) engineering (e.g. astigmatism, double helix or saddle point PSFs) or bi-plane imaging, or interferometric SMLM (e.g. iPALM) with or without z-stepping. In particular embodiments, the training data set and the sparse 3D SMLM data to be reconstructed after training of the ANN include corresponding 3D low-resolution wide-field images. When the training data set includes corresponding 3D low-resolution wide-field images, it is possible to use only a 3D low-resolution wide-field image as an input to reconstruct a 3D synthetic dense SMLM images.

Moreover, embodiments of the invention can be extended to multicolor imaging in several ways.

A first approach is to consider SMLM data consisting of raw images taken in p, an integer superior to 1, color channels, which are being processed to obtain p sparse SMLM images. Each color can then be processed independently of the others using the embodiments of the invention (that may be considered as a monocolor ANNA-PALM method), such that p ANNs are trained independently, one for each color, the requirements for training data being the same as for monocolor ANNA-PALM. For inference, sparse multicolor SMLM images are then fed into these p ANNs (each color being assigned to its corresponding ANN), and the resulting p synthetic dense SMLM images are combined into a dense multi-color super-resolution image.

A second approach is to use a single ANN to process p color channels simultaneously, taking p sparse SMLM images (one for each color) as input, and generating p dense SMLM images as output (one for each color). This will require minor modifications to the ANN architecture to accommodate p color channels as input and output. In this second approach, the ANN can learn the joint probability density of all p color channels simultaneously. As a consequence, the reconstruction of each color channel can be influenced by the information content of the other color channels, allowing further improvements of reconstruction quality and/or acquisition efficiency.

A third approach is to train an ANN to produce multi-color images as output from single color input data, i.e. performing color unmixing. In this approach, the training data would consist of SMLM images acquired in p color channels, each corresponding to a different target molecule. The p color images can be combined into a single color image simply by ignoring the color channel. The ANN can be trained using this single color image (which contains localizations from all p molecular species) as input, with the p color images as target outputs. The input data can be sparser than the target data (as in monocolor ANNA-PALM) or not (for color unmixing without reduction of acquisition time). Once trained, this ANN will be applied to images where the p molecular species are imaged in the same color channel. This strategy can increase the number of distinct species that can be imaged simultaneously (with SMLM or not), since it no longer requires spectrally distinguishable fluorescent dyes.

It is to be noted that embodiments of the invention do not necessitate any changes to existing localization microscopy systems, but only require a few standard SMLM images for training, for example STORM images (being observed that even though a single STORM image is sufficient to train the system, even better results (higher accuracy or efficiency) can be expected by training the system on a larger set of images).

Moreover, embodiments of the invention related to the system described by reference to FIGS. 20 to 24 can be extended to improve the resolution of images acquired by different methods of microscopy such as wide-field fluorescence microscopy, confocal microscopy, or super-resolution microscopy methods such as Structured Illumination Microscopy (SIM), STimulated Emission Depletion (STED), Electron Microscopy (EM) or Cryo-Electron Microscopy (CryoEM). This approach relies on the training of the system with pairs of images obtained from two microscopy techniques having different resolutions, the input images being obtained from the microscopy technique having the lower resolution and the corresponding desired images (target image) obtained from the microscopy technique having the higher resolution. For example, low-resolution wide-field images can be used as inputs of artificial neural network 2000 that may be considered as a generator network that outputs synthetic EM images, while target EM images, corresponding to the desired outputs, are compared with the outputs of artificial neural network 2000, to adapt the parameters of the latter accordingly. To train the system, input and target images should be aligned to the same field of view and should be registered pixel by pixel. If the two images do not have the same pixel size, interpolation can be used to enlarge the smaller one to the larger one such that they have the same pixel size used to train the artificial neural network. Practically, aligned images mixing different super-resolution techniques can be obtained with a same microscope equipped with different modules. In the case of EM, the Correlative Light Electron Microscopy technique combines light microscopy with electron-microscopy. In this approach, several images obtained by different microscopy techniques having or not a different resolution, can also be used as inputs if their respective resolution are lower than the resolution of the target image. For example, the artificial neural network can be trained with triplets of confocal microscopy and corresponding SIM images as inputs, and corresponding EM images as target images.

Moreover, embodiments of the invention related to the system described by reference to FIGS. 20 to 24 can be extended to improve the specificity of images obtained by Electron-Microscopy (EM). This technique does not permit to specifically stain or label different molecular species to perform multi-channel imaging such as multi-color imaging in light microscopy. To improve the specificity of EM, the artificial neural network can be trained with EM images as inputs, and the corresponding aligned light microscopy image, in which desired elements are labelled, as target images in order to reconstruct synthetic labelled EM images.

FIG. 19 schematically illustrates a processing device 1900 configured to implement at least one embodiment of at least part of the invention, for example one or several of the algorithms described by reference to FIGS. 3 to 9. The processing device 1900 may be a device such as a microcomputer, a workstation, or a highly parallel computer. The device 1900 comprises a communication bus 1913 to which there are preferably connected:

- a central processing unit 1911, such as a microprocessor, denoted CPU;
- a read only memory 1907, denoted ROM, for storing computer programs for implementing the invention;
- a random access memory 1912, denoted RAM, for storing the executable code of the method of embodiments of the invention as well as the registers adapted to record variables and parameters necessary for implementing the method for improving the assembling of raw images obtained by single molecule localization microscopy according to embodiments of the invention; and
- a communication interface 1902 connected to a communication network 1903 over which digital data to be processed can be transmitted.

Optionally, the apparatus 1900 may also include the following components:

- a data storage means 1904 such as a hard disk, for storing computer programs for implementing methods of one or more embodiments of the invention and data used or produced during the implementation of one or more embodiments of the invention;
- a disk drive 1905 for a disk 1906, the disk drive being adapted to read data from the disk 1906 or to write data onto said disk;
- a screen 1909 for displaying data and/or serving as a graphical interface with the user, by means of a keyboard 1910 or any other pointing means; and
- graphic processing units (GPU), not represented, that allow parallel processing of large matrix data and that may be used, in particular, for carrying out operations of the artificial neural network(s). GPU may prove to be important for optimizing computation time.

The communication bus provides communication and interoperability between the various elements included in the apparatus 1900 or connected to it. The representation of the bus is not limiting and in particular the central processing unit is operable to communicate instructions to any element of the apparatus 1900 directly or by means of another element of the apparatus 1900.

The disk 1906 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method for improving the assembling of raw images obtained by single molecule localization microscopy according to embodiments of the invention to be implemented.

The executable code may be stored either in read only memory 1907, on the hard disk 1904 or on a removable digital medium such as for example a disk 1906 as described previously. According to a variant, the executable code of the programs can be received by means of the communication network 1903, via the interface 1902, in order to be stored in one of the storage means of the apparatus 1900 before being executed, such as the hard disk 1904.

The central processing unit 1911 is adapted to control and direct the execution of the instructions or portions of software code of the program or programs according to the invention, instructions that are stored in one of the aforementioned storage means. On powering up, the program or programs that are stored in a non-volatile memory, for example on the hard disk 1904 or in the read only memory 1907, are transferred into the random access memory 1912, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Naturally, in order to satisfy local and specific requirements, a person skilled in the art may apply to the solution described above many modifications and alterations all of which, however, are included within the scope of protection of the invention as defined by the following claims.

The invention claimed is:

1. A computer method for reconstructing at least one synthetic dense super-resolution image (ANNA-SMLM(ki)) from at least one low-information-content image (SMLM (ki), Li), the at least one low-information-content image comprising a low-resolution wide-field image (Li), the method comprising:
   obtaining the at least one low-information-content image;
   inputting the at least one obtained low-information-content image to an artificial neural network, and
   obtaining the synthetic dense super-resolution image from the artificial neural network,
wherein the artificial neural network has been trained with training data comprising triplets of sparse localization images (SMLM(ki)) obtained from sequences of diffraction-limited images acquired by single molecule localization microscopy, at least partially corresponding low-resolution wide-field images (Li), and corresponding dense super-resolution images (SMLM(Ki)), as a function of a training objective function comparing dense super-resolution images and corresponding outputs of the artificial neural network.

2. The method according to claim 1, wherein the at least one low-information-content image further comprises a sparse localization image (SMLM(ki)) reconstructed from a sequence of diffraction-limited images according to single molecule localization microscopy image processing.

3. The method according to claim 2, further comprising:
   obtaining a sequence of diffraction-limited images; and
   reconstructing the sparse localization image from the obtained sequence of diffraction-limited images.

4. The method according to claim 3, wherein the low-resolution wide-field image corresponds at least partially to the diffraction-limited images used for reconstructing the sparse localization image.

5. The method according to claim 4, further comprising computing an error map, the error map representing a probability of errors to occur as a function of locations in the synthetic dense super-resolution image.

6. The method according to claim 5, wherein the computing of the error map comprises generating a low-resolution image (L'(k)) from the synthetic dense super-resolution image, the generated low-resolution image being compared with the low-resolution wide-field image inputted into the artificial neural network.

7. The method according to claim 1, wherein the training objective function comprises at least one parameter to select a subset of the training data to be inputted into the artificial neural network.

8. The method according to claim 1, wherein the training objective function comprises at least one of an objective function based on an artificial neural network of the conditional generative adversarial network type and wherein the low-resolution wide-field image inputted into the artificial neural network is used as a condition of the conditional generative adversarial network.

9. The method according to claim 1, wherein the sparse localization images are 3D sparse localization images and the dense super-resolution images are 3D dense super-resolution images.

10. The method according to claim 1, wherein the sparse localization images are multicolor sparse localization images and the dense super-resolution images are multicolor dense super-resolution images.

11. A computer method for reconstructing at least one synthetic dense super-resolution image (ANNA-SMLM'(ki)) from a sequence of diffraction-limited images acquired by single molecule localization microscopy, the method comprising:
    obtaining the sequence of diffraction-limited images acquired by single molecule localization microscopy;
    reconstructing a sparse localization image (SMLM'(ki)) from the obtained sequence of diffraction-limited images according to single molecule localization microscopy image processing;
    inputting the reconstructed sparse localization image to an artificial neural network, and
    obtaining the synthetic dense super-resolution image from the artificial neural network,
wherein the artificial neural network has been trained with training data comprising pairs of sparse localization images (SMLM(ki)) and corresponding dense super-resolution images (SMLM(Ki)), as a function of a training objective function comparing dense super-resolution images and corresponding outputs of the artificial neural network.

12. The method according to claim 11, wherein the diffraction-limited images of the obtained sequence correspond to a first field of view of a field of study, and the obtaining of the sequence of diffraction-limited images, the reconstructing of the sparse localization image from the obtained sequence of diffraction-limited images, the inputting of the reconstructed sparse localization image to the artificial neural network, and the obtaining of the synthetic dense super-resolution image from the artificial neural network being repeated for at least one second field of view of the field of study, the first and the second fields of view being different.

13. The method according to claim 12, wherein the first field of view and the second field of view are contiguous within the field of study, the method further comprising creating a resulting image by stitching synthetic dense super-resolution images obtained from the artificial neural network.

14. The method according to claim 11, wherein the diffraction-limited images of the obtained sequence correspond to a predetermined field of view, and the obtaining of the sequence of diffraction-limited images, the reconstructing of the sparse localization image from the obtained sequence of diffraction-limited images, the inputting of the reconstructed sparse localization image to the artificial neural network, and the obtaining of the synthetic dense super-resolution image from the artificial neural network being repeated periodically for the same field of view.

15. The method according to claim 11, further comprising training the artificial neural network and pairing sparse localization images and corresponding dense super-resolution images for training the artificial neural network.

16. The method according to claim 15, wherein the pairing of the sparse localization images and corresponding dense super-resolution images comprises:
    obtaining a training sequence of diffraction-limited images acquired by single molecule localization microscopy;
    reconstructing a plurality of sparse localization images from first sub-sets of the obtained training sequence of diffraction-limited images according to a single molecule localization microscopy image processing; and
    reconstructing a plurality of dense super-resolution images from second sub-sets of the obtained training sequence of diffraction-limited images according to a single molecule localization microscopy image processing, each of the second sub-sets comprising more diffraction-limited images than each of the first sub-sets.

17. The method according to claim 11, wherein the sparse localization images are 3D sparse localization images and the dense super-resolution images are 3D dense super-resolution images.

18. The method according to claim 11, wherein the sparse localization images are multicolor sparse localization images and the dense super-resolution images are multicolor dense super-resolution images.

19. An apparatus for reconstructing at least one synthetic dense super-resolution image (ANNA-SMLM(ki)) from at least one low-information content image (SMLM(ki), Li), the at least one low-information-content image comprising a low-resolution wide-field image (Li), the apparatus being configured to carry out the following method:
    obtaining the at least one low-information-content image;
    inputting the at least one obtained low-information-content image to an artificial neural network; and
    obtaining the synthetic dense super-resolution image from the artificial neural network;
    wherein the artificial neural network has been trained with training data comprising triplets of sparse localization images (SMLM(ki)) obtained from sequences of diffraction-limited images acquired by single molecule localization microscopy, at least partially corresponding low-resolution wide-field images (Li), and corresponding dense superresolution images (SMLM(Ki)), as a function of a training objective function comparing dense super-resolution images and corresponding outputs of the artificial neural network.

20. A non-transitory computer storage medium for a programmable apparatus, the non-transitory computer storage medium storing instructions for carrying out the method according to claim 1 when the program is loaded and executed by a programmable apparatus.

* * * * *